United States Patent [19]

Tischer et al.

[11] Patent Number: 5,623,852
[45] Date of Patent: Apr. 29, 1997

[54] ADJUSTING DRIVE SYSTEM FOR TRANSMISSION OF MOTORIZED VEHICLES

[75] Inventors: Dieter Tischer, Wendlingen; Alfred Trzmiel, Grafenberg, both of Germany

[73] Assignee: Hydraulik-Ring Antriebs- und Steuerungstechnik GmbH, Nürtingen, Germany

[21] Appl. No.: 224,860

[22] Filed: Apr. 8, 1994

[30] Foreign Application Priority Data

Apr. 10, 1993 [DE] Germany .................... 43 11 855.0

[51] Int. Cl.$^6$ .................... F16H 59/04; F16H 61/28; F16H 63/08
[52] U.S. Cl. .................... 74/473 R; 74/335
[58] Field of Search .................... 74/335, 473 R, 74/479.01, 473 P

[56] References Cited

U.S. PATENT DOCUMENTS

| 4,580,457 | 4/1986 | Ishida et al. ............ 74/473 R X |
| 4,899,607 | 2/1990 | Stainton ................. 74/473 R |
| 4,938,088 | 7/1990 | Langley et al. .......... 74/473 R X |
| 5,297,453 | 3/1994 | Chene .................... 74/473 R X |
| 5,357,822 | 10/1994 | Lanting et al. ......... 74/335 X |
| 5,417,124 | 5/1995 | Huff et al. ............... 74/335 |

FOREIGN PATENT DOCUMENTS

| 422278 | 4/1991 | European Pat. Off. ..... 74/473 R |
| 899906 | 11/1953 | Germany ................. 74/473 R |
| 1441079 | 6/1976 | United Kingdom ......... 74/473 R |

*Primary Examiner*—Khoi Q. Ta
*Attorney, Agent, or Firm*—Robert W. Becker & Associates

[57] ABSTRACT

An adjusting drive system for a transmission of a motorized vehicle has a gear shifting shaft and a first and a second adjusting drive operatively connected to the gear shifting shaft. The first adjusting drive rotates the gear shifting shaft and the second adjusting drive axially displaces the gear shifting shaft. The adjusting drives may be linear drives or rotary drives with respective axially displaceable adjusting members or rotary adjusting members. The adjusting drive system may also have at least two gear shifting shafts and at least two adjusting drives whereby one of the adjusting drives is respectively connected to one of the gear shifting shafts.

8 Claims, 18 Drawing Sheets

Fig.2
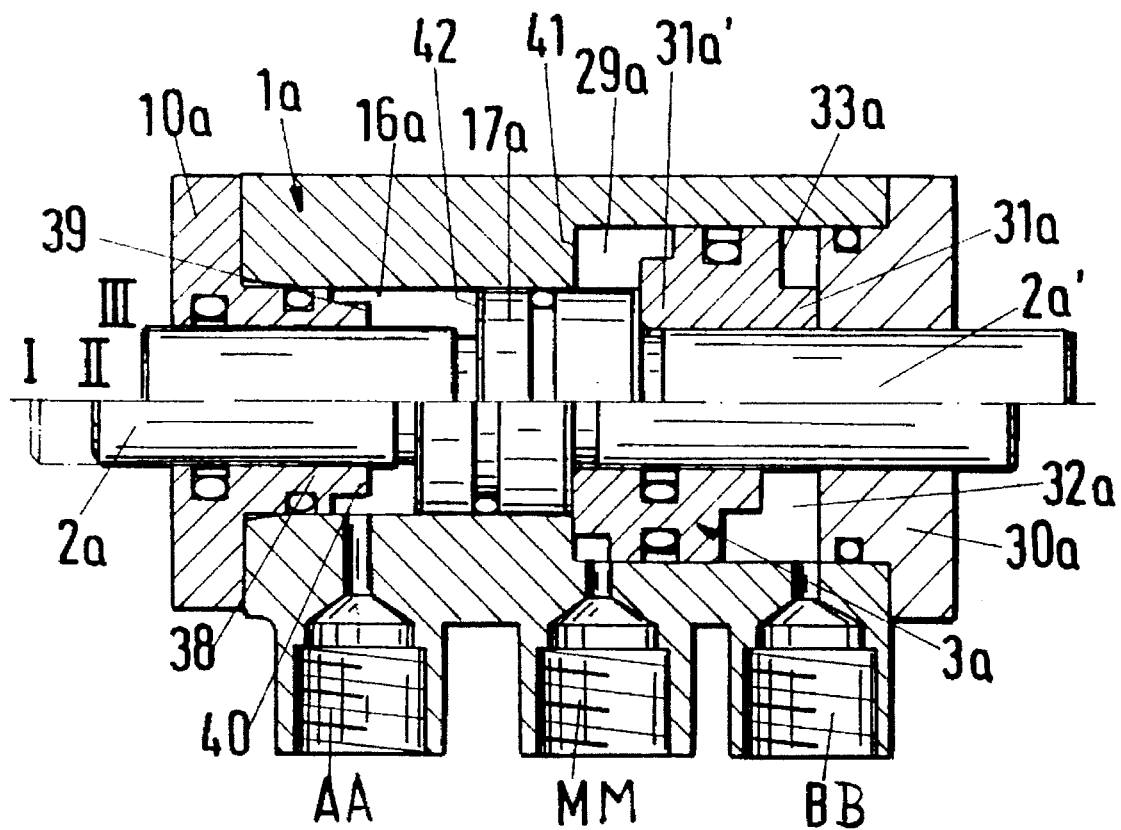
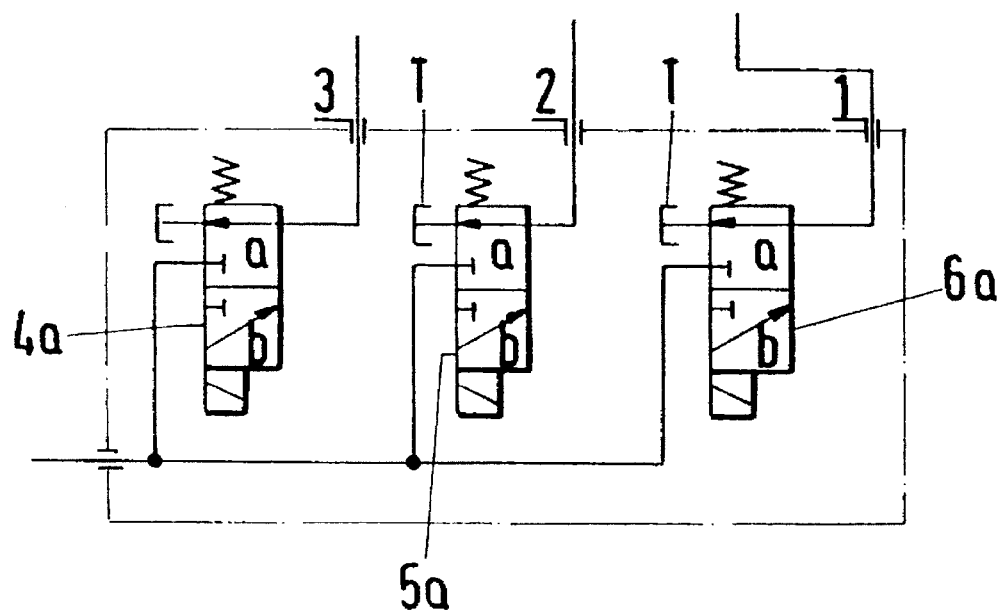

Fig.4f
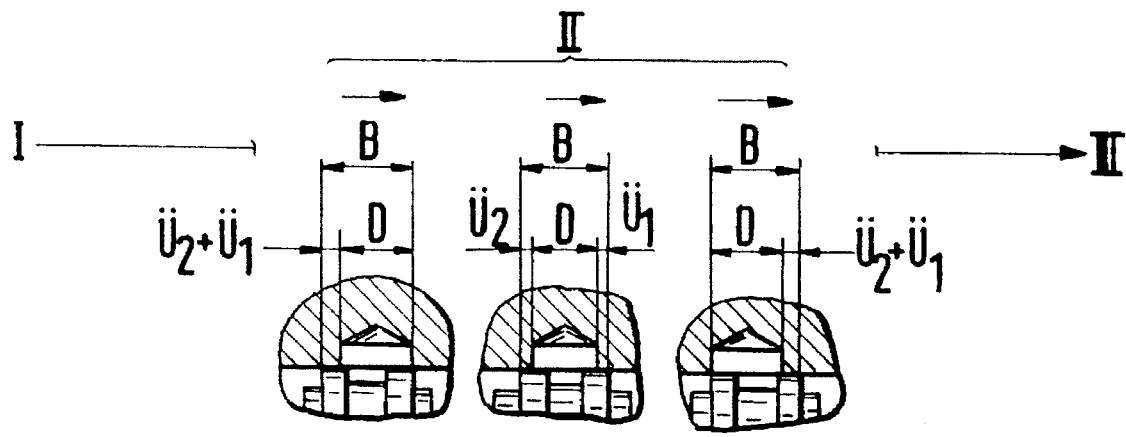
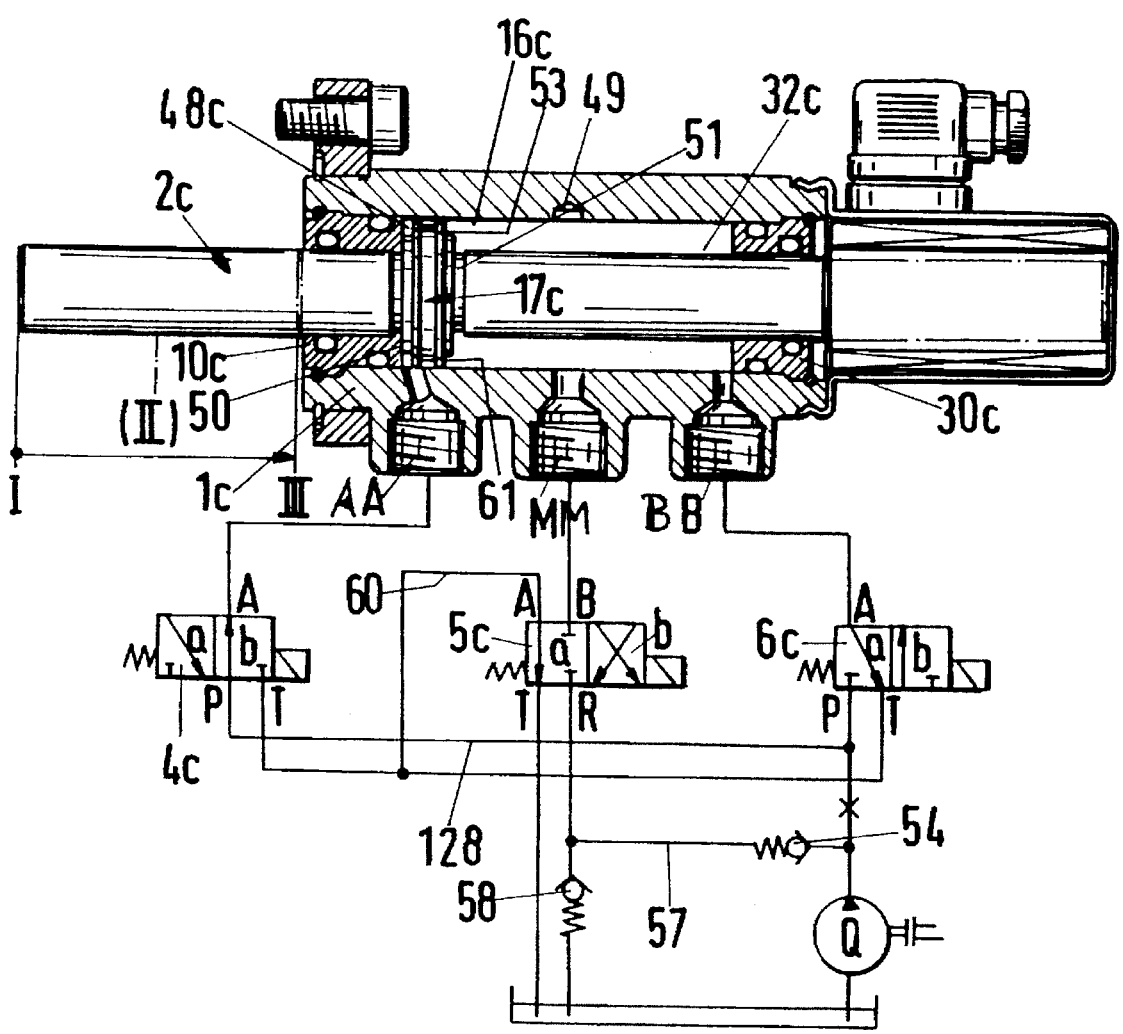

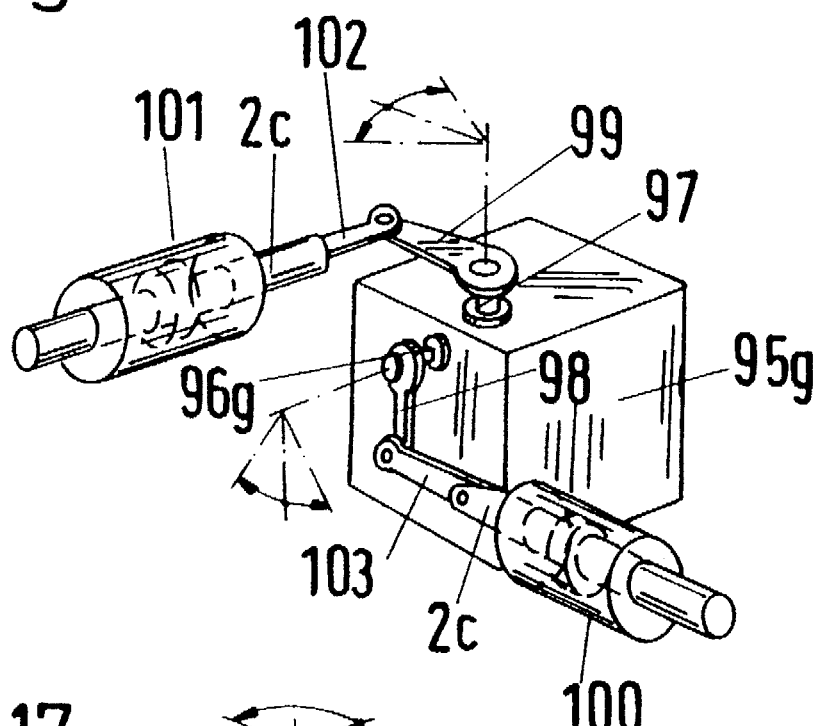
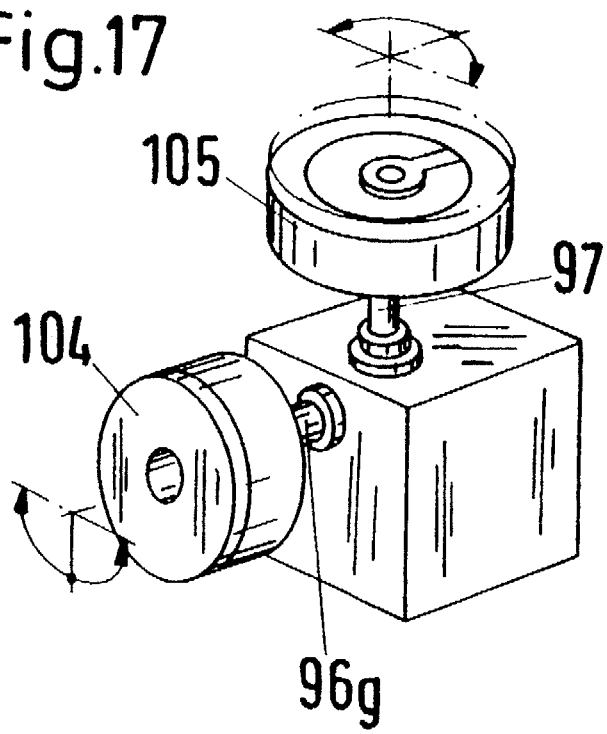

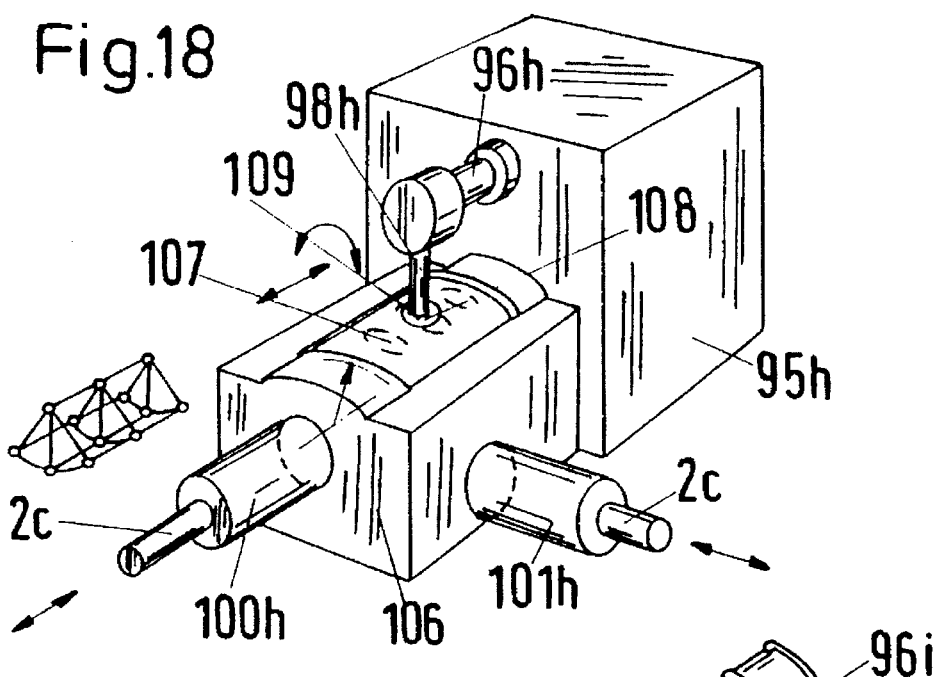
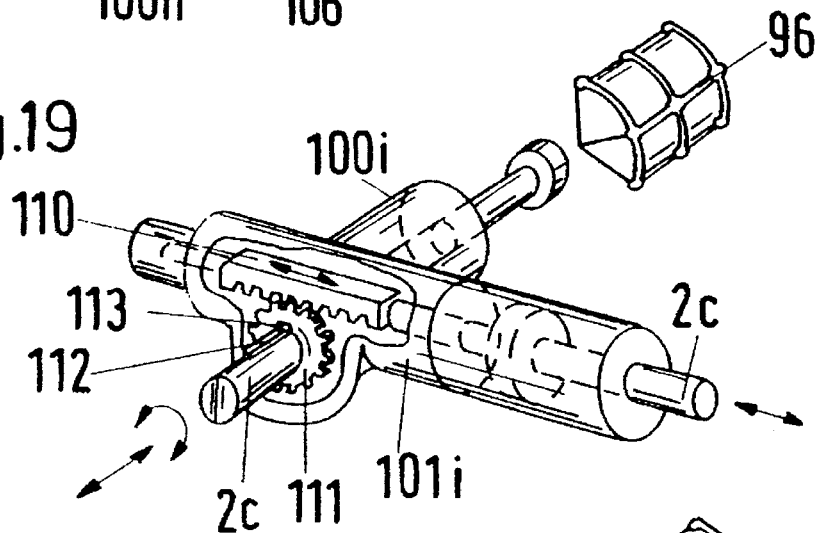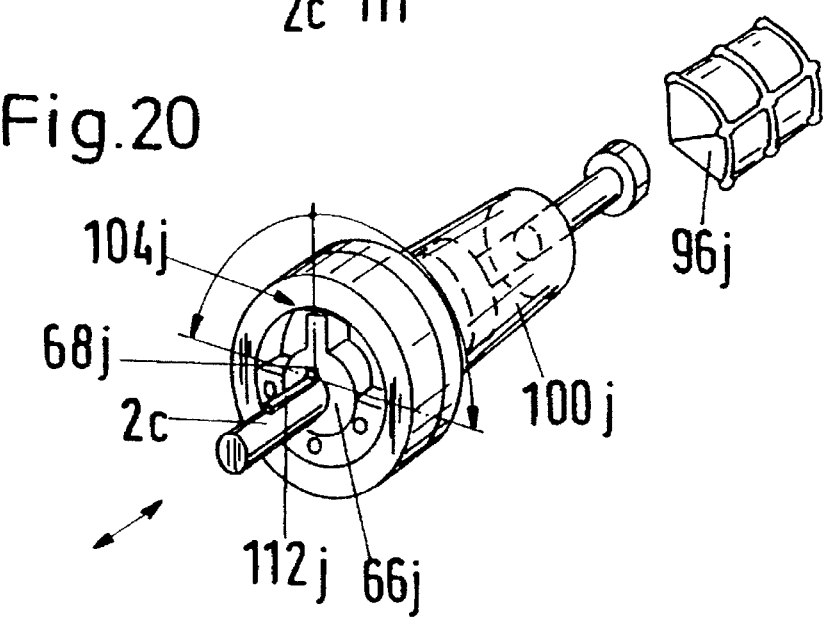

ADJUSTING DRIVE SYSTEM FOR TRANSMISSION OF MOTORIZED VEHICLES

BACKGROUND OF THE INVENTION

The present invention relates to an adjusting drive system for a transmission of motor vehicles with one or more gear shifting shafts.

In motorized vehicles different gears are selected with a gear shift lever that is operated by hand. Automatic transmissions are also known. However, they are of an entirely different construction than manual transmissions. Accordingly, two entirely different transmissions must be manufactured and mounted. Furthermore for both transmission types spare parts must be kept in storage.

It is therefore an object of the present invention to provide an adjusting drive system with which for providing manual and automatic gear shifting only one single transmission construction is required.

BRIEF DESCRIPTION OF THE DRAWINGS

This object, and other objects and advantages of the present invention, will appear more clearly from the following specification in conjunction with the accompanying drawings, in which:

FIGS. 2–4 show in representations corresponding to FIG. 1 further embodiments of inventive adjusting drives;

FIGS. 16 and 17 respectively show in schematic representation further transmissions with two gear shifting shafts which are coupled to adjusting drives;

FIGS. 18–20 show in schematic representations further embodiments of transmission to which adjusting drives are coupled;

SUMMARY OF THE INVENTION

Figure 1:
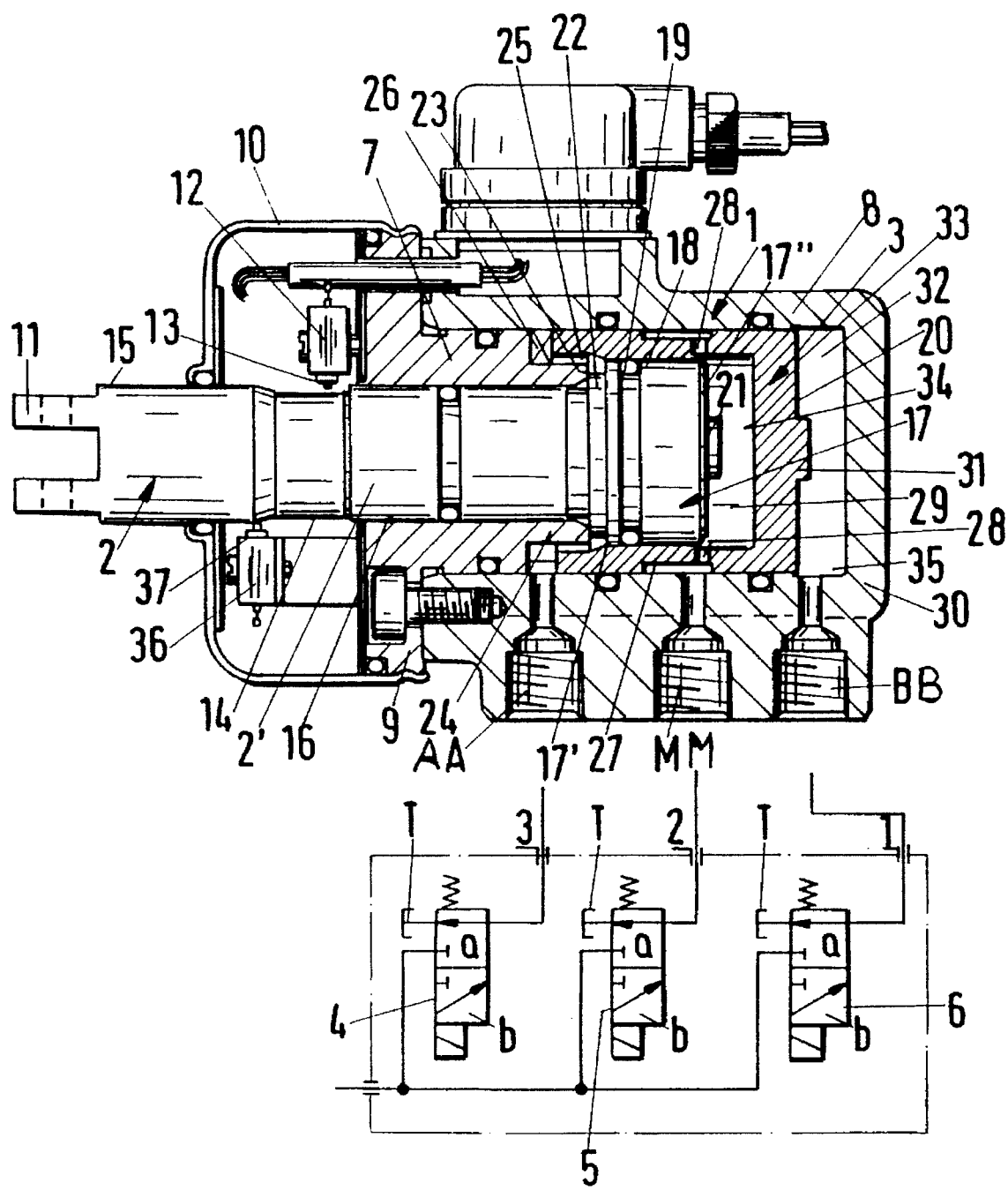
FIG. 1 shows a longitudinal section of one embodiment of an inventive adjusting drive.

The adjusting drive system for a transmission of a motorized vehicle according to the present invention is primarily characterized by:

A gear shifting shaft; and

A first and a second adjusting drive operatively connected to the gear shifting shaft, wherein the first adjusting drive rotates the gear shifting shaft and the second adjusting drive axially displaces the gear shifting shaft.

Preferably, at least one of the adjusting drives is a linear drive having an axially displaceable adjusting member. Advantageously, the first adjusting member is a linear drive and the second adjusting member is a linear drive. The axially displaceable adjusting members in this embodiment are displaceable transverse to one another, preferably perpendicular to one another.

Advantageously, the system further comprises a switching element connected to the gear shifting shaft and to the first and second adjusting drives. Expediently, the switching element is rotatably connected to the adjusting member of the first adjusting drive and has a toothing. The adjusting member of the second adjusting drive preferably has a toothed rack engaging the toothing of the adjusting member of first adjusting drive.

In a preferred embodiment of the present invention, the gear shifting shaft has a lever and the switching element has a receiving element for receiving the lever. The lever preferably extends radially from the gear shifting shaft and is fixedly connected thereto.

Advantageously, the adjusting members of the first and second adjusting drives directly engage one another.

Advantageously, the adjusting member of the first adjusting drive has a toothing and the adjusting member of the second adjusting drive has a toothed wheel. The toothing engages the toothed wheel. Preferably, the toothing is a toothed rack.

In a preferred embodiment of the present invention, the toothed wheel is fixedly connected to the adjusting member of the second adjusting drive. Advantageously, the inventive system further comprises a housing in which housing the toothing and the toothed wheel are contained.

In another embodiment of the present invention, the axially displaceable adjusting member of the first adjusting drive comprises a ring with a lever, the ring being fixedly connected to the adjusting member such that the lever extends radially from the adjusting member. The axially displaceable adjusting member of the second adjusting drive comprises a receiving element for receiving the lever. Advantageously, the lever is pivotably connected to the adjusting member of the second adjusting drive so as to be pivotable within the receiving element transverse to a longitudinal extension of the lever.

Advantageously, the adjusting member of the first adjusting drive has a lever and the adjusting member of the second adjusting drive has a pivot arm that is connected to the lever.

In a further embodiment of the present invention, the first adjusting drive is a linear drive and the second adjusting drive is a rotary drive having a rotary adjusting member, wherein the rotary adjusting member is fixedly connected on the axially displaceable adjusting member.

Preferably, at least one of the adjusting drives is a rotary drive having a rotary adjusting member.

In another embodiment of the present invention, an adjusting drive system for a transmission of motorized vehicles preferably has at least two gear shifting shafts and at least two adjusting drives wherein each one of the adjusting drives is operatively connected with one of the gear shifting shafts. Advantageously, the adjusting drives are directly connected to the gear shifting shafts.

Expediently, the system further comprises intermediate members connected between the adjusting drives and the gear shifting shafts. Preferably, the adjusting drives are linear drives or, in the alternative, they are rotary drives.

It is also possible that one of the adjusting drives is a linear drive and one of the adjusting drives is a rotary drive.

With the inventive adjusting drive system it is possible to use one single transmission design for manual gear shifting as well as for automatic gear shifting. In a first embodiment of the present invention, the transmission has a single gear shifting shaft which can be actuated with the adjusting drives such that the respective gear shifting paths and gears are selected. The two cooperating adjusting drives replace the gear shift lever conventionally used with manual transmissions and the corresponding shifting linkage.

When it is desired to operate such a transmission by hand, a different transmission design is not required, instead it is possible that the automobile manufacturer employs in the well known manner the gear shift lever and the required shifting linkage which cooperates with the transmission in the conventional manner. Accordingly, the automobile manufacturer must provide only one single embodiment of a transmission for manual gear shifting as well as automatic gear shifting. Depending on the preference of the consumer, the transmission is connected with a conventional gear shift lever or for automatic gear shifting with the two cooperating adjusting drives.

In a second embodiment of the present invention, in which the transmission has at least two gear shifting shafts, each gear shifting shaft is provided with one adjusting drive with which the gear shifting shaft can be operated in the required manner.

Due to the inventive embodiment it is thus possible for an automobile manufacturer to provide only one embodiment of a transmission that can be operated either manually or with the adjusting drives in an automatic manner. Since for the automatic as well as for the manual operation only one single transmission design is required, the number of spare parts that must be provided in storage is substantially reduced. Expenditures for storage are therefore much lower. For automatic gear shifting a gear transmission is also used which, in comparison to conventional automatic transmissions with torque converters, has a substantially greater efficiency.

DESCRIPTION OF PREFERRED EMBODIMENTS

The present invention will now be described in detail with the aid of several specific embodiments utilizing FIGS. 1 through 25.

The adjusting drives described in the following are designed to shift the gear shifting shaft of transmissions of motorized vehicles.

The adjusting drives represented in FIGS. 1 through 4 are linear drives in which a piston rod is axially displaced in order to shift the gear shifting shaft of the transmission. FIGS. 5 to 13 show rotary adjusting drives for adjusting the gear shifting shaft.

The adjusting drive according to FIG. 1 has a housing 1 in which a main piston 2 and an auxiliary piston 3 are axially slidably arranged. The housing 1 has three connecting adapters AA, MM, and BB to which is respectively connected a flow-control valve 4 to 6.

The housing 1 is comprised advantageously of two detachably connected housing parts 7 and 8. The housing part 7 has a radially outwardly extending flange 9 with which it rests at the end face of a cup-shaped housing part 8. The housing part 7 extends into the housing part 8 and rests sealingly at its inner side of the housing part 8. Within the cylindrical housing part 7 the main piston 2 is guided which extends through a cover 10 that is connected to the outer mantle surface of the housing part flange 9, to the exterior. The end 11 of the main piston 2 which extends from the housing 1 has two connecting brackets which are spaced from one another. In the area between the cover 10 and the housing part 7 a switch, respectively, a sensor 12 is arranged that is provided with a sensor pin 13 which rests at the main piston 2. When the sensor pin 13 is in the left end position (position I) represented in FIG. 1, then the sensor pin 13 rests at the bottom of an annular groove 14 of the main piston 2. When the main piston 2 is displaced from this left end position to the right, the sensor pin 13 moves onto the mantle surface 15 of the main piston 2 and is thus displaced. With the switch 12 a corresponding signal is then transmitted to a non-represented electronic monitoring device. On the other hand, the switch 12 does not transmit a signal when the main piston 2 is positioned in the left end position represented in FIG. 1 in which the sensor pin 13 extends from the switch 12. The switch 12 together with the sensor pin 13 are part of a position control system for the main piston which also has two further switches with sensor pins for the positions II and III of the main piston 2. Of these further switches a switch 36 with sensor pin 37 is represented in FIG. 1. In the left end position of the main piston 2 (position I), represented in FIG. 1, the sensor pin 37 rests directly at the transition of the mantle surface 15 into the annular groove 14. With the three switches the three positions I to III of the main piston 2 can be reliably controlled.

The main piston 2 is guided at the inner wall 16 of the housing part 7 and has a piston land 17 at its end positioned within the housing 1. The piston land 17 has a diameter that is greater than the diameter of the piston rod 2'. The piston land 17 rests at the inner wall of the auxiliary piston 3. The piston land 17 is provided with an annular groove 18 for receiving a sealing ring 19 with which the piston land 17 rests sealingly at the inner wall of the auxiliary piston 3. The piston land 17 is provided at its end face facing the bottom 20 of the auxiliary piston 3 with a central projection 21 that in cross-section is circular and has a planar end face and a diameter that is substantially smaller than the piston land 17.

At the opposite side the piston land 17 has an intermediate piece 22 of a circular cross-section which in diameter is smaller than the land 17, but has a greater diameter than the piston rod 2'.

In the left end position represented in FIG. 1 the intermediate piece 22 rests at the end face 23 of the housing part 7 positioned with the housing part 8. With this abutment position the left end position I of the main piston 2 is defined.

The end face 23 of the housing part 7 is provided at an end portion 24 with a reduced outer diameter. The outer diameter of this end portion 24 is smaller than the inner diameter of the auxiliary piston 3 so that between the two parts an annular gap 25 is formed through which pressure (hydraulic) medium can flow from the connecting adapter AA to the piston land 17 in a manner which will be described in the following.

The end portion 24 is surrounded by a support ring (stop) 26 at which the auxiliary piston 3 with its end face positioned within the housing 1 rests in its left end position.

The auxiliary piston 3 is provided at its exterior with an annular groove 27 which is constantly in connection with the connecting adapter MM. Openings 28 open into the annular groove 27 which openings are distributed over the periphery of the auxiliary piston 3 and which connect the annular groove 27 with the pressure chamber 29 between the piston land 17 of the main piston 2 and the bottom 20 of the auxiliary piston 3.

The left end position of the auxiliary piston 3 represented in FIG. 1 provides for a further pressure chamber 32 between the bottom 20 and the bottom 30 of the housing part 8 which in the represented position of the main piston 2 and the auxiliary piston 3 communicates with the connecting adapter BB.

The end face of the bottom 20 of the auxiliary piston 3 which faces the housing bottom 30 is also provided with a centrally arranged projection 31 of a circular cross-section which is provided with a planar end face.

With the aid of the auxiliary piston 3 it is possible to displace the main piston 2 into a total of three positions I, II, and III. In the intermediate position II of the main piston 2 the auxiliary piston III serves as an abutment.

Starting with the initial position I represented in FIG. 1, in which the main piston 2 and the auxiliary piston 3 are respectively positioned in their left end positions, the flow-control valve 4 is opened (switching position b) so that the hydraulic (pressure) medium can flow via the connecting adapter AA and the annular gap 25 to the piston land 17. Simultaneously, the pressure in the pressure chamber 29 is relieved by switching the flow-control valve 5 to the switching position a. The flow-control valve 6 is possible to displace the main piston 2 into a switched into position b such that the pressure chamber 32 is pressurized. Since the end face 33 facing the housing bottom 3 has a greater surface area than the inner end face 34 of the auxiliary piston bottom 20, the auxiliary piston 3 is maintained in its abutment position due to the pressure present within the pressure chamber 32 in which abutment position the auxiliary piston 3 rests at the support ring (stop) 26. The main piston 2 is displaced, due to the pressure supplied via the connecting adapter AA, to the right in FIG. 1 until the projection 21 at the end face 34 of the auxiliary piston bottom 20 reaches its abutment. Since the pressure chamber 29 is not pressurized, the main piston 2 can be displaced into its intermediate position in which the auxiliary piston 3 serves as an abutment for the main piston 2. This is position II.

If it is desired to reach the position III from position II, the flow-control valve 6 is switched such that a connection to the reservoir T is provided (switching position a). The two other flow-control valves 4 and 5 remain in their respective switching position. The main piston 2 can thus be displaced together with the auxiliary piston 3 due to the pressure acting on the annular surface 17' of the piston land 17 until the projection 31 of the auxiliary piston 3 rests at the housing bottom 30. This results in the third position III.

It is also possible to displace the main piston 2 directly from the position I represented in FIG. 1 into the described position III. In this case the two flow-control valves 5 and 6 are switched such that they respectively provide a connection to the reservoir T (switching position a). Thus, the hydraulic medium introduced via the connecting adapter AA can displace the main piston 2 and the auxiliary piston 3 in one move into the position III in which the auxiliary piston 3 with its projection 31 rests at the housing bottom 30 and the main piston 2 with its projection 21 rests at the auxiliary piston bottom 20.

When it is desired to return both pistons 2 and 3 from the position III, the flow-control valve 6 is switched to the switching position b while the flow-control valve 5 is switched such that a connection to the reservoir T is provided (switching position a). The flow-control valve 4 is switched to supply pressure (switching position b). Since the piston surface 17' of the piston land 17 loaded by the pressure is substantially smaller than the piston surface 34 of the auxiliary piston 3, the auxiliary piston 3 and the main piston 2 are displaced together. As soon as the auxiliary piston 3 abuts at the support ring (stop) 26, the position II has been reached. The main piston 2 remains in this position II as long as the annular surface 17' of the piston land 17 is supplied with pressure via the connecting adapter AA, since the pressure chamber 29 is without pressure.

If it is desired to displace the main piston 2 into the position I represented in FIG. 1, the flow-control valve 5 is switched to supply pressure (switching position b) so that via the connecting adapter MM the pressure chamber 29 and thus the piston land surface 17" is loaded with pressure. The flow-control valve 6 maintains the pressure (switching position b) so that, upon pressurizing the piston land surface 17" from the pressure chamber 29, the auxiliary piston 3 remains in its abutment position represented in FIG. 1. The flow-control valve 4 is switched such that the connection to the reservoir T is provided (switching position a). Due to the pressure within the pressure chamber 29, the main piston 2 is thus displaced into its position I in which it abuts with the intermediate piece 22 at the housing part 7.

In order to load the pressure chamber 32 with pressure in the right end position of the auxiliary piston 3, the inner wall of the housing part 8 in the area of the connecting adapter BB is provided with an annular groove 35 via which the hydraulic (pressure) medium can be introduced into the pressure chamber 32 when the auxiliary piston 3 is in its right end position. The two projections 21 and 31 of the main piston 2 and the auxiliary piston 3 ensure that the respective piston surfaces are loaded with pressure in their respective end positions.

The diameter of the piston rod 2', of the piston land 17 and of the end face 33 of the auxiliary piston bottom 20 are selected such that a surface area ratio of, for example, approximately 1:2:3 results. Due to this surface area ratio, greatly varying inlet and outlet flow volumes result as a function of the displacement paths which flow volumes can be reliably supplied and removed within the desired adjusting time. This embodiment is characterized by a compact construction and a small number of components.

The embodiment according to FIG. 2 operates in principle in the same manner as the aforedescribed embodiment. In the lower half the main piston 2a and the auxiliary piston 3a are shown in solid lines in the intermediate position II while the upper half shows the position III. In the lower half the position I for the main piston 2a is represented in dash-dotted lines. The main piston 2a is again provided with a piston land 17a which is guided at the inner wall 16a of the housing 1a. The piston land 17a has a greater diameter than the piston rod 2a' which extends sealingly through the cover 10a. The cover 10a is provided with a sleeve-shaped part 38 positioned within the housing 1a and having an end face 39 at which the piston land 17a in the left position I of the main piston 2a rests. The end face 39 is provided with an end portion 40 having a reduced outer diameter the outer mantle surface of which is spaced at a distance from the inner wall 16a of the housing 1a. In this area, the connecting adapter AA opens into the housing and has connecting thereto the flow-control valve 4a.

In contrast to the previous embodiment the piston land 17a is not provided at the end of the main piston 2a but approximately at half its length. The auxiliary piston 3a is thus seated on the piston rod 2a'. The auxiliary piston 3a is guided within an area of the housing 1a provided with a greater inner diameter and has on both end faces a ring-shaped projection 31a, 31a' which is penetrated by the piston rod 2a'.

Between the auxiliary piston 3a and the housing bottom 30a the pressure chamber 32a is formed which communicates with the connecting adapter BB that is connected with the flow-control valve 6a. The connecting adapter MM opens into the pressure chamber 29a and is connected to the flow-control valve 5a. The pressure chamber 29a is limited axially by the auxiliary piston 3a as well as by a radially inwardly extending annular shoulder surface (stop) 41 and radially by the housing 1a as well as the main piston 2a, respectively, its piston land 17a.

In the left end position of the main piston 2a and of the auxiliary piston 3a (position I) the piston land 17a rests at the end face 39 of the sleeve part 38 of the cover 10a while the auxiliary piston 3a rests at the annular shoulder surface (stop) 41 of the housing 1a.

When it is desired to reach the position II, pressure is supplied via the connecting adapter AA and the flow-control valve 4a (switching position b) to the piston land 17a. The pressure chamber 32a is also supplied with pressure via the connecting adapter BB and the flow-control valve 6a (switching position b). Since the piston surface 33a of the auxiliary piston 3a facing the pressure chamber 32a is greater than the annular surface 42 of the piston land 17a which is loaded by the hydraulic (pressure) medium, upon displacement of the main piston 2a from the position I (dash-dotted line) into the position II (lower representation of FIG. 2) the auxiliary piston 3a is maintained by the pressure present within the pressure chamber 32a in its left end position. The main piston 2a is thus displaced to such an extent that it comes to rest at the auxiliary piston 3a. In this embodiment the auxiliary piston 3a thus also serves as an abutment for the main piston 2a in the position II.

When the main piston 2a is to be displaced into the position III (upper half of FIG. 2), the flow-control valve 6a is switched such that a connection to the reservoir T is provided (switching position a). Accordingly, upon further displacement the main piston 2a can entrain the auxiliary piston 3a until the projection 31 of the auxiliary piston 3a abuts at the bottom 30a.

The main piston 2a may also be displaced from the position I into the position III in one displacement step. In this case, the two flow-control valves 5a and 6a are switched such that a connection to the reservoir T is provided (switching position a). Via the connecting adapter AA the hydraulic (pressure) medium is introduced into the space before the piston land 17a so that the main piston 2a is displaced to the right. The main piston 2a is then moved in one step into the position III whereby it again entrains the auxiliary piston 3a until it abuts at the bottom 30a.

With the respective switching of the flow-control valves 4a to 6a the main piston 2a and/or the auxiliary piston 3a are again returned into their respective left end positions. When the main piston 2a and the auxiliary piston 3a are positioned in the right end position (position III), then the pressure chamber 32a is supplied with pressure by switching the flow-control valve 6a (switching position b) in order to reach the position II, while the two flow-control valves 4a and 5a are switched such that a connection to the reservoir T results (switching position a). Accordingly, the main piston 2a and the auxiliary piston 3a can be displaced by the pressure medium introduced into the pressure chamber 32a.

As soon as the auxiliary piston 3a abuts at the abutment (stop) 41 at the housing, the position II has been reached. In order to displace the main piston 2a again into the position I, pressure is again generated in the pressure chamber 29a by switching the flow-control valve 5a (switching position b). The flow-control valve 6a remains in the switching position b so that within the pressure chamber 32a pressure is generated. Due to the pressure medium present within the pressure chamber 29a, the main piston 2a is displaced into the position I, while the auxiliary piston 3a due to the pressure within the pressure chamber 32a remains in its abutment position.

In this embodiment the surface area ratio of the surfaces to be pressure-loaded is approximately 1:2. Accordingly, depending on the displacement paths, different inlet and outlet flow volumes result whereby the difference between them is smaller than in the embodiment according to FIG. 1. The adjusting drive is designed such that the oil (pressure medium) volumes can be supplied and removed in a reliable manner within the desired adjusting time. This embodiment is characterized by a small constructive volume and by having only few components.

Figure 3:
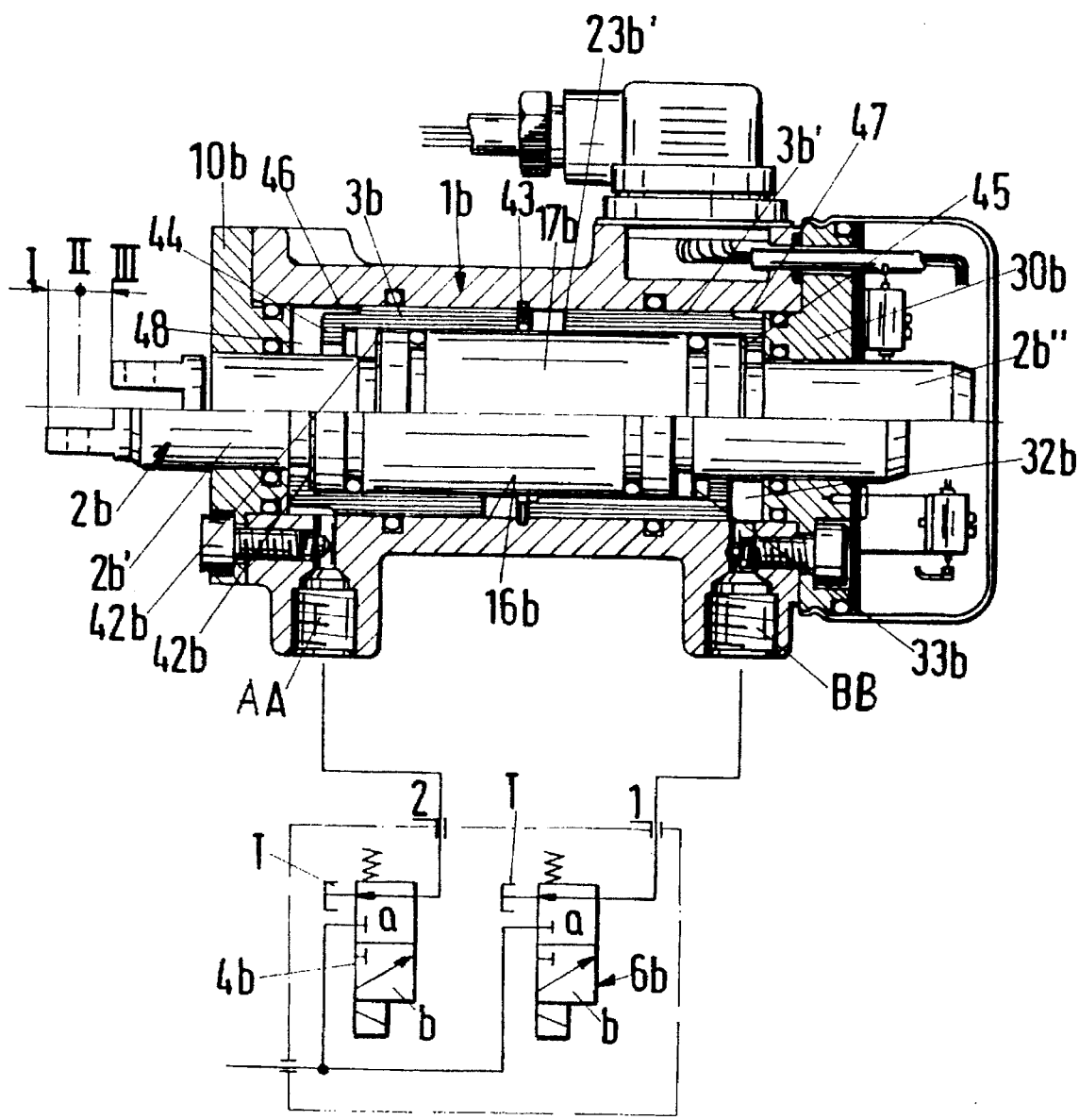

In the embodiment according to FIG. 3 only two flow-control valves 4b and 6b are required in contrast to the embodiments of FIGS. 1 and 2. In the housing 1b two auxiliary pistons 3b and 3b' are arranged so as to be mirror-symmetrical to one another. The auxiliary pistons 3b and 3b' are sleeve-shaped and surround the piston land 17b of the main piston 2b. Furthermore, the two auxiliary pistons 3b, 3b' rest at the inner wall 16b of the housing 1b. The piston land 17b is seated centrally on the main piston 2b having two piston rods 2b', 2b" that extend with both ends axially from the housing 1b.

The two auxiliary pistons 3b, 3b' have coordinated therewith a common abutment 43 connected to the housing which in the shown embodiment is a spring ring that is inserted into the inner wall 16b of the housing 1b.

The two auxiliary pistons 3b, 3b' at their ends facing away from one another are provided with a radially inwardly extending flange 44 and 45, respectively, with which in their respective end positions I and III they abut at the cover 10b, respectively, at the bottom 30b. In the lower half of FIG. 3 the position I and in the upper half the position III are represented.

In the position I the auxiliary piston 3b abuts with the flange 44 at the cover 10b. The piston land 17b of the main piston 2b rests at the flange 44. The other auxiliary piston 3b' rests with its end face 23b', that is facing the auxiliary piston 3b, at the abutment 43 connected to the housing. The flange 45 of the auxiliary piston 3b' in this position is spaced from the piston land 17b. The two auxiliary pistons 3b, 3b' have a reduced outer diameter at their ends provided with the flanges 44, 45 so that in the respective end position of the auxiliary pistons an annular chamber 46, 47 is formed between the auxiliary pistons 3b, 3b' and the housing wall into which annular chambers, through the corresponding connecting adapter AA, respectively, BB hydraulic medium can be introduced.

In the position III (upper half of FIG. 3) the flange 45 of the auxiliary piston 3b' rests at the bottom 30b. The main piston 2b abuts at the flange 45 with the annular surface 33b of its piston land 17b that is facing the flange 45. The other auxiliary piston 3b abuts at the abutment (stop) 43 at the housing. The neighboring annular surface 42b of the piston land 17b is spaced axially from the flange 44 of the auxiliary piston 3b. In order to be able to displace the main piston 2b from the position III into the position II, the flow-control valve 6b is switched such (switching position b) that in the pressure chamber 32b between the bottom 30b and the piston ring surface 33b pressure medium is introduced. In order to allow the passage of hydraulic (pressure) medium from the annular chamber 47 to the piston ring surface 33b of the piston land 17b, the auxiliary piston 3b' is provided with non-represented through bores for the hydraulic (pressure) medium. The auxiliary piston 3b' and the main piston 2b are thus displaced from the position III into the position II. Depending on the provided tolerance, the auxiliary piston 3b' abuts with its end face 23b' at the abutment (stop) 43 at the housing or the piston land 17b of the main piston 2b comes into contact with its ring surface 42b at the flange 44 of the auxiliary piston 3b. The valve 4b is switched such (switching position b) that the pressure chamber 48 at the other end of the housing 1b is pressurized. Accordingly, the auxiliary piston 3b remains in the abutment position represented in the upper half. This auxiliary piston 3b, respectively, the abutment 43 at the housing thus define the position of the main piston 2b in the position II.

When it is desired to reach the position I, the flow-control valve 4b is switched such (switching position a) that a connection to the reservoir T results. The flow-control valve 6b remains in the pressurizing position (switching position b). Accordingly, the main piston 2b together with the auxiliary piston 3b are displaced into the position I represented in the lower half of the FIG. 3. The auxiliary piston 3b rests with its flange 44 at the cover 10b while the annular surface 42b of the piston land 17b rests at the flange 44.

In this embodiment it is also possible to displace the main piston 2b in one movement from the position III into the position I. In this case, the flow-control valve 4b is switched such that the connection to the reservoir T is provided (switching position a). Accordingly, the main piston 2b together with the auxiliary piston 3b is displaced until the auxiliary piston 3b' comes to rest at the abutment (stop) 43 at the housing. Upon further displacement of the main piston 2b the auxiliary piston 3b remains, in the manner described before, in its end position.

When the piston 2b is to be returned into the position II or the position III, the two flow-control valves 4b and 6b are switched in the opposite direction. The movement is the same; however, it occurs in the counter direction.

This embodiment is characterized advantageously by introducing and removing volume flows of the hydraulic medium on both sides of the piston land 17b in a ratio of approximately 1:2. Accordingly, only a medium oil (pressure medium) consumption is required.

Figure 4:
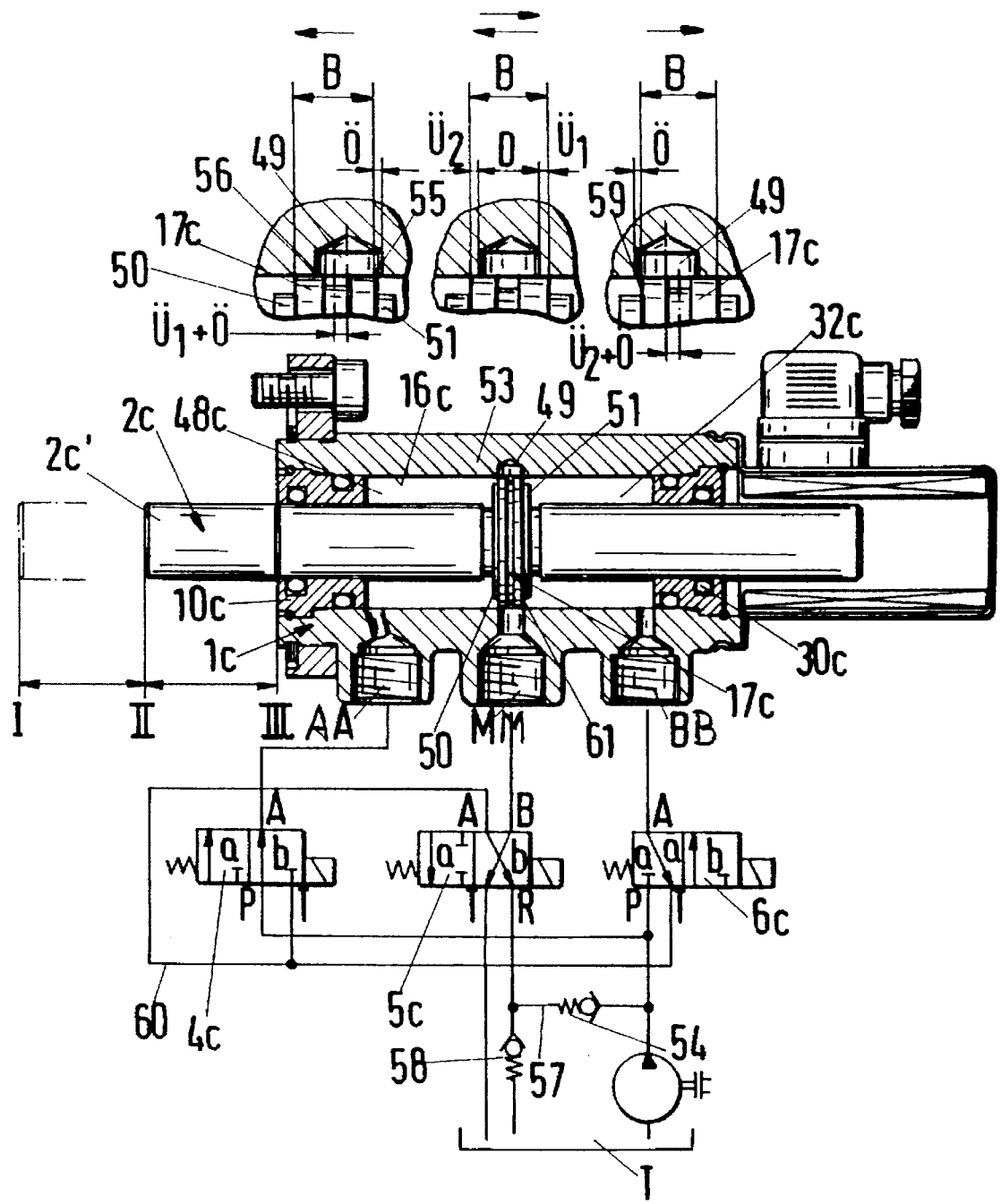

In the embodiment according to FIG. 4 no auxiliary piston is required. The function of the auxiliary piston is taken over by the piston land 17c which cooperates with a control opening 49 in the housing 10. The piston land 17c has a width B that is greater than the width D of the cross-section of the control opening 49. In the represented embodiment the control opening 49 is a bore in the inner wall 16c of the housing 1c. In the top half of the drawings of FIG. 4 the respective positions of the piston land 17c in the intermediate position II are represented in enlarged representation. The piston land 17c has on both end faces a respective collar 50, 51 that has a smaller outer diameter than the piston land 17c.

Since the width B of the piston land 17 is greater than the diameter D of the control opening 49, the bore 49 is covered by the piston land 17c when the piston land 17c is positioned centrally with respect to the control opening 49. In this scenario a coverage Ü1, Ü2 within a range of 0.1 mm is provided.

Figure 4A:
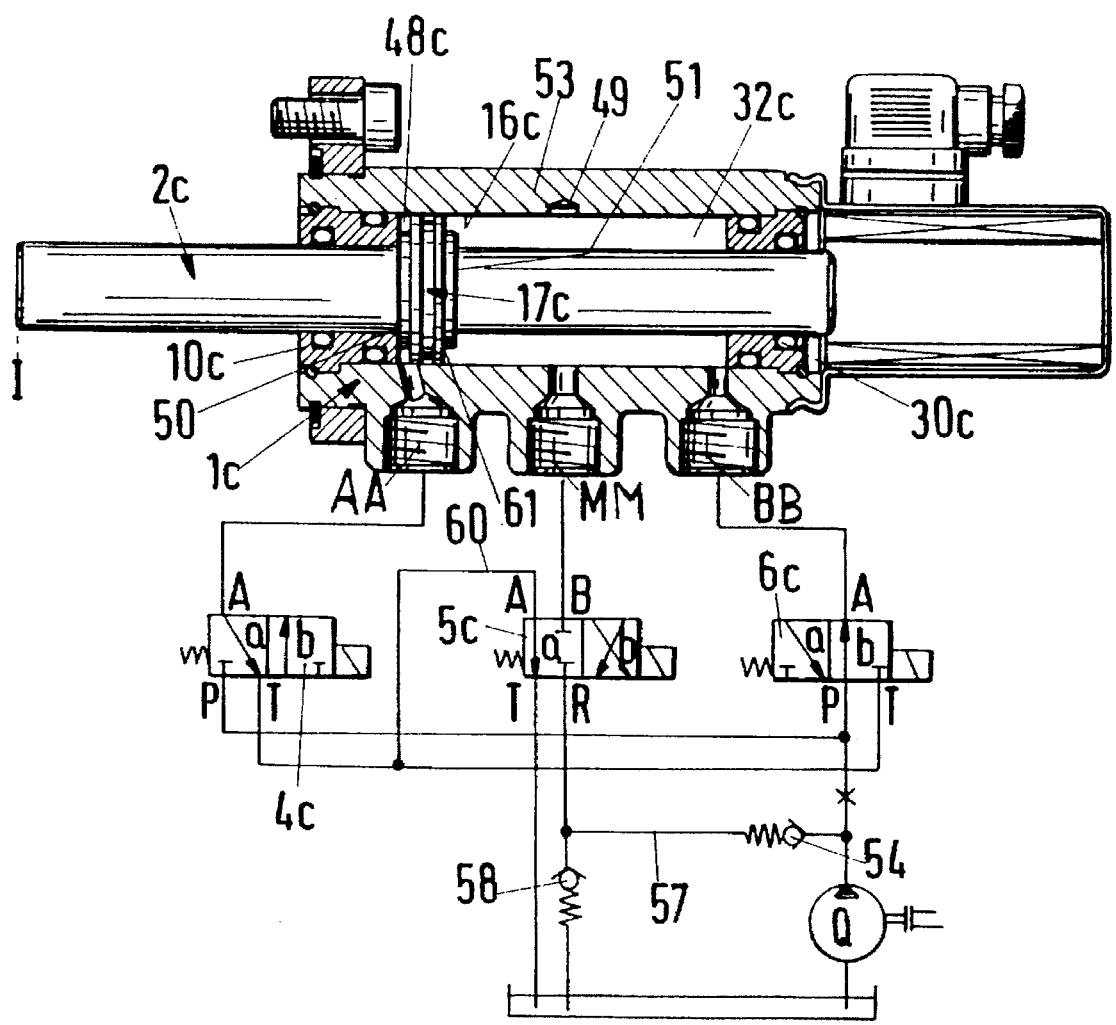

In the initial position (position I) of the main piston 2c the piston land 17c abuts with its collar 50 at the cover 10c through which the piston rod 2c' of the main piston extends sealingly (FIG. 4a). The flow-control valves 4c and 5c are in a spring-actuated switching position a. The connecting adapter AA of the housing 1c is accordingly connected to the reservoir and is without pressure. The flow-control valve 6c is positioned in the solenoid-actuated switching position b. The connecting adapter BB of the housing 1c is thus connected to the pressure medium source Q.

The pressurized hydraulic medium thus loads the annular surface 61 of the piston land 17c which accordingly abuts at the cover 10c.

The connecting adapter MM of the housing 1c is connected with a connecting adapter BB of the valve 5c which in the spring-loaded switching position a is in the closed position and prevents that the pressurized hydraulic (pressure) medium can flow out of the cylindrical pressure chamber 32c.

The hydraulic medium supplied by the pressure medium source Q flows via a pressure limiting valve 54 and a pressurizing valve 58 to the reservoir T. Accordingly, within the pressure chamber 32c a pressure is generated which corresponds to the preset pressure value of the pressure limiting valve 54 which, for example, is 30 bar. Upstream of the pressurizing valve 58 a pressure is generated which corresponds also to the preset pressure value of that valve 58, for example, 5 bar.

The hydraulic medium is supplied from the pressure medium source Q via a throttle DR limiting the volume flow and the flow-control valve 6c which is in the switching position b to the connecting adapter BB and from there into the pressure chamber 32c. The flow-control valve 5c is in the switching position a so that the hydraulic medium within the pressure chamber 32c cannot flow via the connecting adapter MM and the flow-control valve 5c to the reservoir T. The piston land 17c is thus loaded on its right side by the hydraulic (pressure) medium and the main piston 2c is thus maintained in the position I represented in FIG. 4a. In this position I no oil (pressure medium) consumption occurs so that the hydraulic (pressure) medium supplied by the pressure medium source Q can flow via the pressure limiting valve 54 and the pressurizing valve 58 to the reservoir T.

The flow-control valve 4c which is in the switching position a thus relieves the connecting adapter AA of the housing 1c so that the connector A of the valve 4c communicates with the connector T of this valve. The hydraulic medium can thus flow from the connector T of the valve 4c via the line 60 to the connector A of the valve 5c and from there via the connector T of this valve 5c to the reservoir T.

Figure 4B:
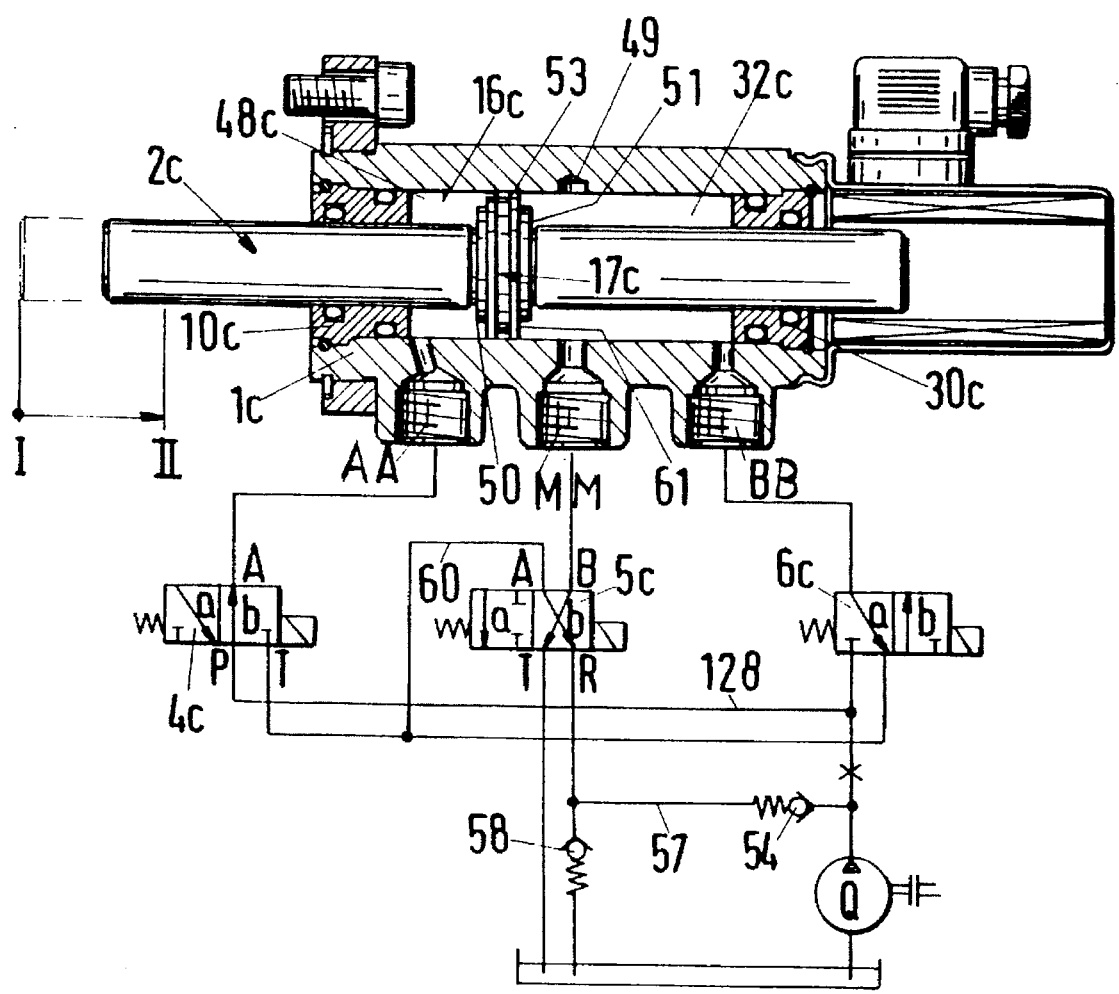

For the displacement of the main piston 2c from the position I into the position II (FIG. 4b), the hydraulic (pressure) medium is introduced via the connecting adapter AA and the valve 4c in the switching position b by way of the collar 50 of a smaller outer diameter into the area between the cover 10c and the piston land 17c of the housing 1c. The pressurized hydraulic medium thus loads the annular surface 53 of the piston land 17c that is formed by the end face of the piston land projecting relative to the collar 50. The two flow-control valves 5c and 6c that are connected to the connecting adapters MM and BB of the housing 1c are switched such that a connection to the reservoir T is produced (flow-control valve 5c is in switching position b, valve 6c is in switching position a). The hydraulic (pressure) medium supplied by the pressure medium source Q flows via line 128 to the connector P of the flow-control valve 4c and from there via the connector A of the valve 4c to the connecting adapter AA of the housing 1c. Thus, the annular surface 53 of the piston land 17c is loaded so that the main piston 2c is displaced from the position I toward the position II within the housing 1c. The hydraulic medium within the pressure chamber 32c is displaced via the connecting adapter MM of the housing 1c and the flow-control valve 5c directly to the reservoir T. During this displacement of the main piston 2c the excess hydraulic (pressure) medium supplied by the pressure medium source Q is guided via the pressure limiting valve 54 to the connector R of the flow-control valve 5c, via its connector A and the line 60 to the connector T of the flow-control valve 6c and from there to the connecting adapter BB of the housing 1c into the pressure chamber 32c. When the pressurizing valve 58 has a lower pressure than the through flow resistance of the hydraulic medium via the aforedescribed path, the hydraulic medium flows via the pressurizing valve 58 directly into the tank T.

Figure 4C:
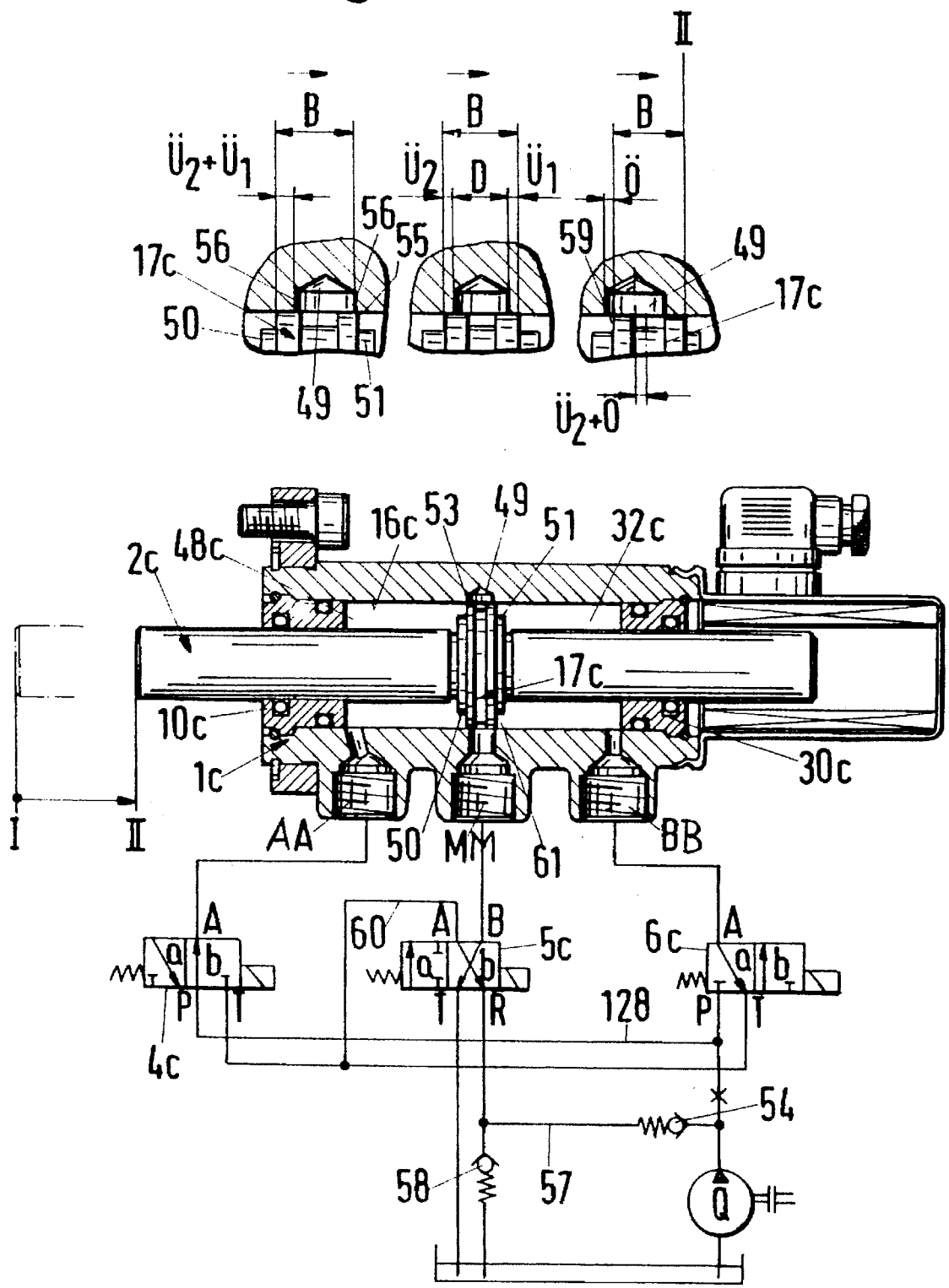

As soon as the piston land 17c with the right control edge 55 in FIG. 4c (upper left representation) passes the edge 56 of the control opening 49 and closes the control opening 49, the flow for the hydraulic medium through the connecting adapter MM is closed off. Accordingly, the hydraulic medium can only be displaced via the connecting adapter BB to the valve 6c.

The hydraulic medium flows via the connecting adapter BB of the housing 1c to the connector A of the flow-control valve 6c and from there via the connector T of the valve 6c and the line 60 to the connector A of the flow-control valve 5c. Via the connector R of the flow-control valve 5c the hydraulic medium is returned via the pressurizing valve 58 to the reservoir T. Accordingly, within the entire flow path to the pressure chamber 32c the preset pressure value of the pressurizing valve 58 is present.

When the control opening 49 upon displacement of the main piston 2c is completely closed by the piston land 17c (upper central representation of FIG. 4c), on both sides of the piston land 17c a pressure ratio corresponding to the preset pressure values of the two valves 54 and 58 is generated. Thus, in the pressure chamber 48c to the left of the piston land 17c a pressure of approximately 30 bar is present, and in the pressure chamber 32c to the right of the piston land 17c a pressure of approximately 5 bar is present. Due to this pressure difference the main piston 2c is further displaced to the right. Accordingly, the left control edge 59 of the piston land 17c (upper right representation of FIG. 4c) opens the control opening 49 to a small extent. Accordingly, within the pressure chamber 48c the pressure can be reduced and lowered to such an extent that the pressure in this pressure chamber 48c corresponds to the pressure within the other pressure chamber 32c. Thus, on both sides of the piston land 17c the same pressure is present so that the main piston 2c remains in its designated position II. In this position II, the control opening 49 is open partially in the manner described above in order to achieve the aforementioned pressure uniformity in both pressure chambers 48c, 32c.

Figure 4D:
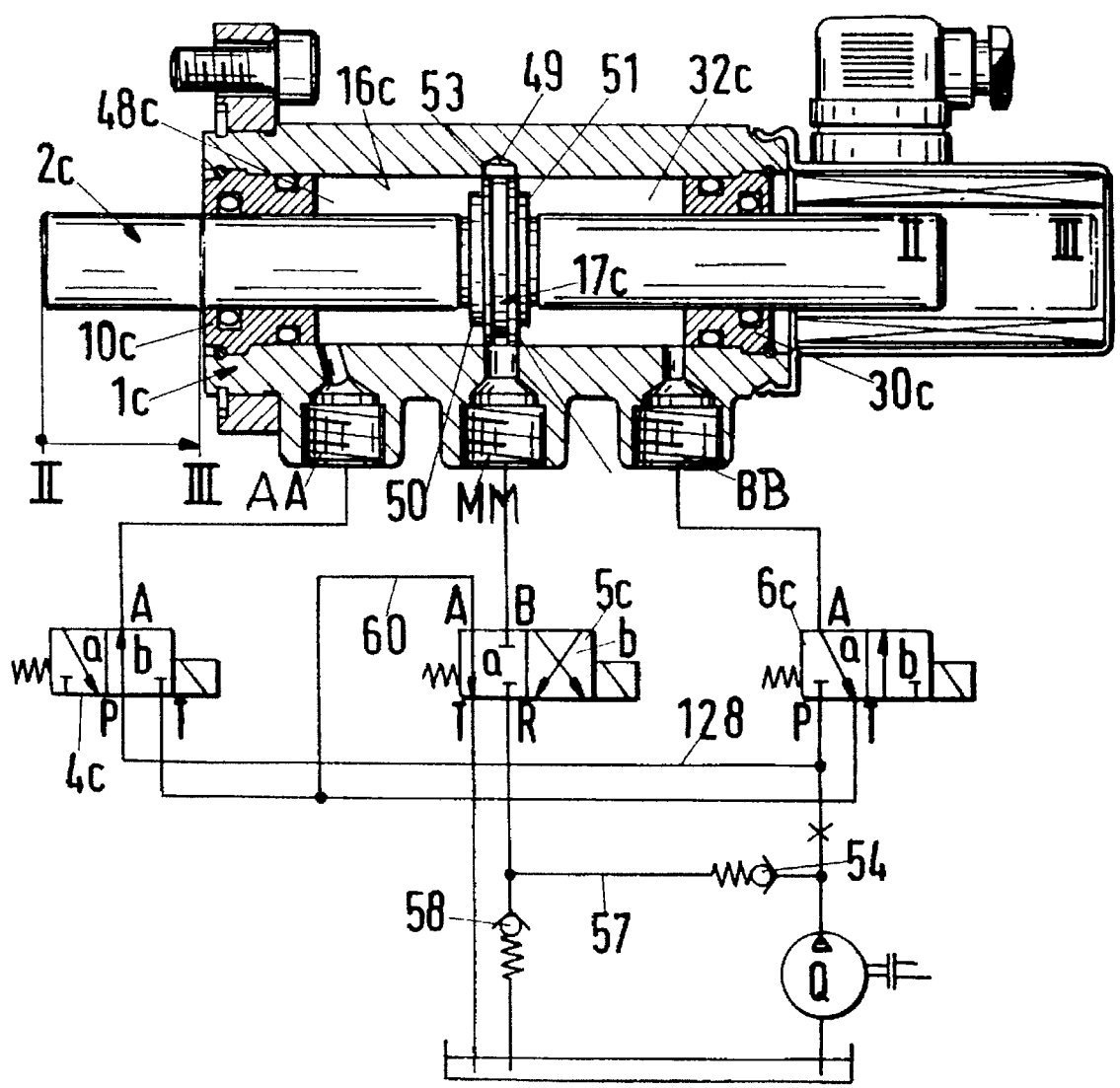

From the position II according to FIG. 4c the piston 2c can be displaced into the position III (FIG. 4d) such that the collar 51 of the piston land 17c abuts at the bottom 30c of the housing 1c after completion of displacement. In order to make possible this displacement of the main piston 2c, the flow-control valve 5c is displaced into the spring-loaded switching position a so that the connection from the connecting adapter MM of the housing 1c to the reservoir T is interrupted. The flow-control valve 4c remains in the solenoid-switched position b. The oil (pressure medium) volume that is displaced from the pressure chamber 32c flows via the connecting adapter BB to the flow-control valve 6c and from there via the line 60 to the valve 5c and without pressure to the reservoir T. In the described abutment position the connecting adapter BB of the housing 1c is not completely closed so that after switching of the flow-control valve 6c the pressure medium can flow via connecting adapter BB to the annular surface 61 of the piston land 17c. The annular surface 61 surrounds the collar 51 of the piston land 17c. Due to this pressurizing action the piston 2c can be returned from the position III into the positions II or I. The flow-control valves 4c to 6c are then correspondingly switched.

Figure 4E:
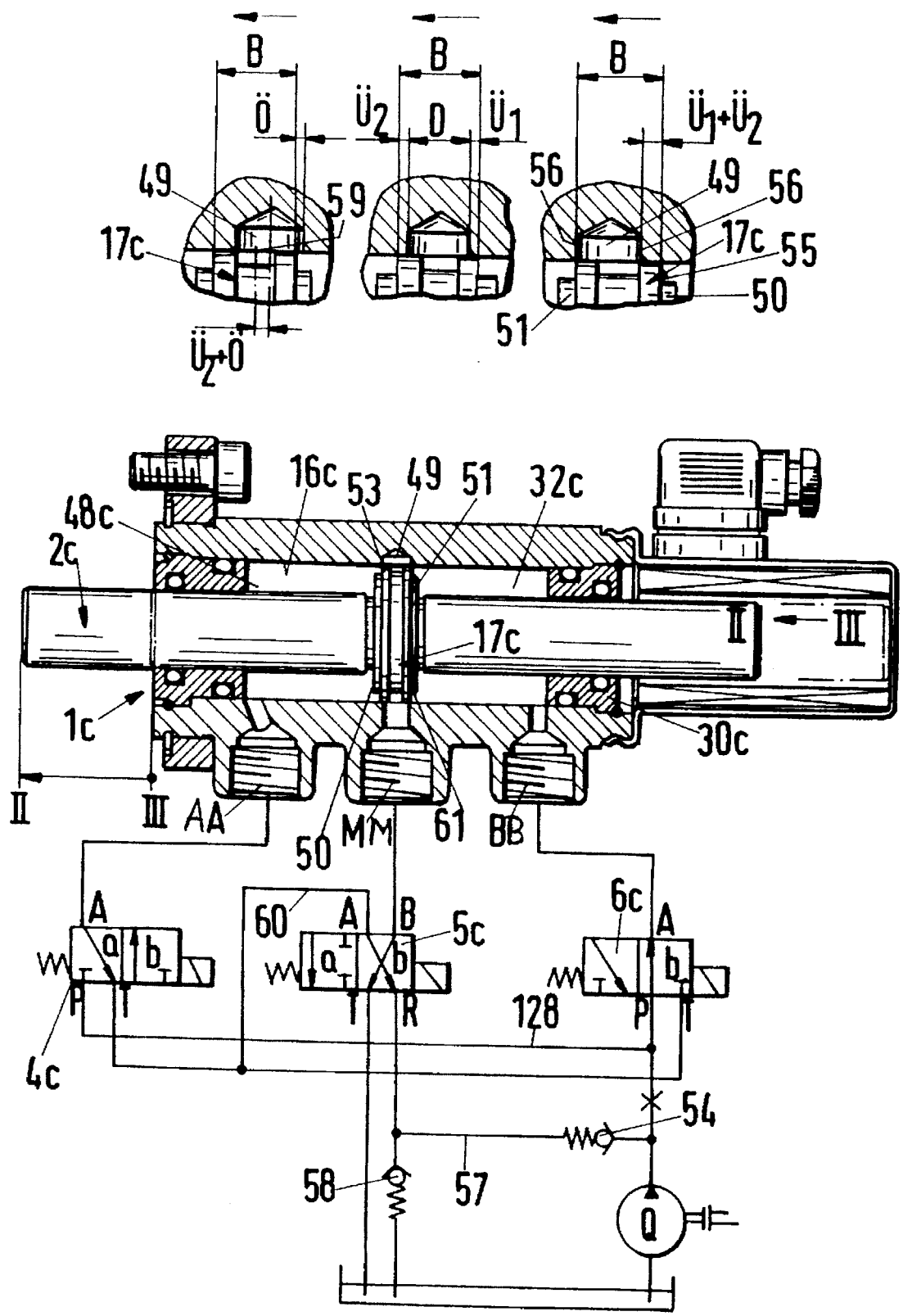

When the piston 2c is returned from the position III into the position II (FIG. 4e), the piston land 17c is in a different end position as if it had been displaced from the position I into the position II. When the piston 2c is switched from the position III into the switching position II, the left control edge 59 of the piston land 17c passes the control opening 49 within the housing 1c. During this displacement of the main piston 2c the flow-control valve 4c is switched such (switching position a) that a connection to the pressurizing valve 58 is provided. Upon displacement of the main piston 2c the hydraulic (pressure) medium within the pressure chamber 48c is displaced via the connecting adapter AA of the housing 1c to the connector A of the flow-control valve 4c. From there it flows via connector T of the valve 4c and the line 60 to the connector A of the flow-control valve 5c. From here it flows via the connector R and the pressurizing valve 58 to the reservoir T. When the control opening 49 is completely closed by the piston land 17c, on both sides of the piston land 17c there is again a pressure ratio present that corresponds to the preset pressure values of the two valves 54 and 58. However, now the higher pressure is present within the pressure chamber 32c so that the piston land 17c is further displaced to the left. The control edge 55 passes the control opening 49 and partially opens it. Accordingly, the pressure within the pressure chamber 32c can be reduced to such an extent that the same pressure is present within the other pressure chamber 48c. The piston 2c thus remains in the position II. This position II of the piston land 17c upon returning from the position III is represented in the left upper portion of FIG. 4e in greater detail. The opening width Ö in comparison to the opening width D of the control opening 49 is relatively small. A comparison of the upper left representation in FIG. 4e with the upper right representation in FIG. 4c shows that the piston land 17c has a different position depending on the direction of approach of the main piston 2c. In both cases the position II of the main piston 2c differs by the size of the overlap Ü and the opening stroke Ö from the exact central position of the piston land 17c which is represented in the upper center representation.

From this position II the main piston 2c can be displaced into the position I. In this case, the flow-control valve 4c is switched to the switching position a and the valve 6c is switched to the switching position b. The flow-control valve 5c remains in the switching position a. The hydraulic medium within the pressure chamber 40c can now be displaced via the connecting adapter AA of the housing 1c to the reservoir T.

The piston 2c may be moved with one displacement movement from the position I into the position III and vice versa (FIG. 4f). During this displacement movement the central connecting adapter MM must be closed. For this purpose, the flow-control valve 5c is switched to the switching position a. When the piston 2c is displaced from the position I into the position III, the flow-control valve 4c is switched into the switching position b and the flow-control valve 6c is switched into the switching position a. Accordingly, the hydraulic medium coming from the pressure medium source Q can be supplied via the line 128 and the flow-control valve 4c into the pressure chamber 48c. Upon displacement of the main piston 2c the hydraulic medium within the pressure chamber 32c is displaced via the connecting adapter BB to the flow-control valve 6c. Via the connector T of the valve 6c the displaced pressure medium flows via the line 60 to the connector A of the flow-control valve 5c and from there via its connector T directly to the reservoir T. When the main piston 2c is displaced in one movement from the position III into the position I, the flow-control valve 5c remains in the switching position a while the other two flow-control valves 4c and 6c are respectively switched. The pressure medium coming from the pressure medium source Q flows via the flow-control valve 6c and the connecting adapter BB into the pressure chamber 32c so that via the loading of the piston land 17c the main piston 2c is displaced in the direction to the position I. The hydraulic medium within the pressure chamber 48c is returned via the connecting adapter AA to the connector A of the valve 4c and via its connector T as well as via the line 60 to the connecting adapter AA of the valve 5c and from there to the reservoir T.

In the shown embodiment three positions for the main piston are provided. Of course, it is possible to provide more than three positions. The housing 1c for this purpose must be provided with a corresponding number of further connecting adapters MM and corresponding flow-control valves. In comparison to the aforedescribed embodiments of FIGS. 1 to 3, in which an auxiliary piston is provided, the embodiment according to FIG. 4 is characterized by a simple construction and a smallest possible constructive volume. Due to the ratio of 1:1 of the annular piston surfaces 53 and 61 a smallest possible oil (pressure medium) consumption is required which is only about half, respectively, a third of the consumption of the aforedescribed embodiments. In order to provide more than three positions, no additional parts are required for the adjusting cylinder.

The adjusting drives according to FIGS. 1 to 4 operate in a linear fashion, i.e., the main piston is axially displaced. In the following, adjusting drives will be described that operate in a rotary fashion and thereby require only little space and can correspondingly be embodied in a compact manner.

Figure 5:
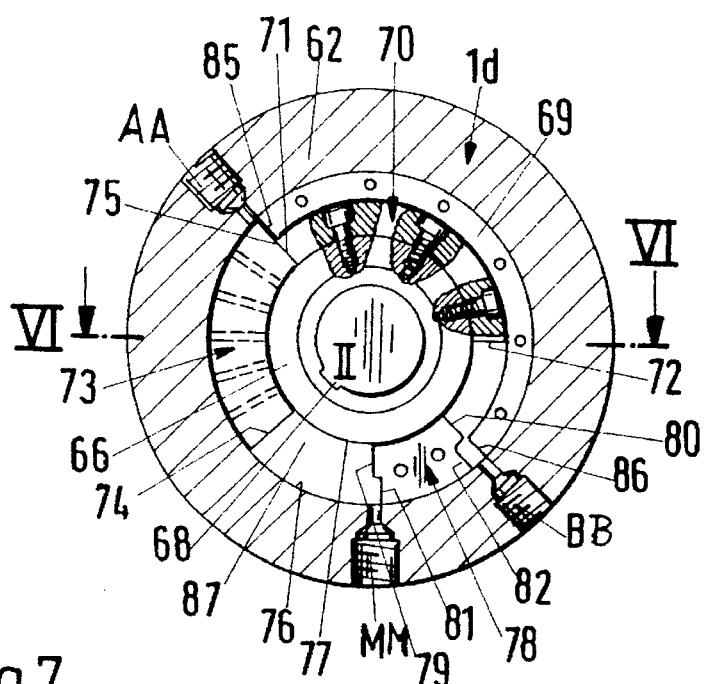
FIG. 5 shows a section of a further embodiment of an inventive adjusting drive.
Figure 6:
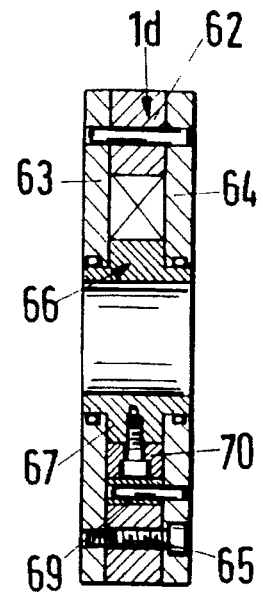
FIG. 6 shows a section along the line VI—VI of FIG. 5.
Figure 7:
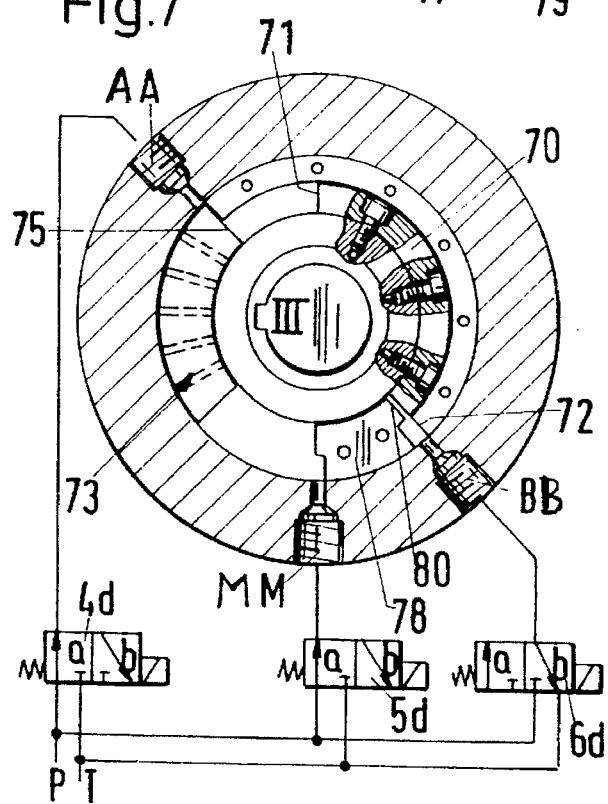
FIGS. 7 and 8 show in representations corresponding to FIG. 5 two further switching positions of the adjusting drive of FIG. 5.

The adjusting drive according to FIGS. 5 to 8 has a cylindrical housing 1d that is formed by a ring 62 and two annular disks 63 and 64 that rest at both end faces of the ring 62. As is shown in FIG. 6, the ring 62 and the two disks 63 and 64 on both end faces are advantageously detachably connected with screws 65 that are advantageously distributed over the circumference of the housing 1d. The ring 62 and the annular disks 63, 64 have a common cylindrical outer wall while the annular disks 63, 64 project radially inwardly past the ring 62. The annular disks 63, 64 rest with their radial inner edge in a sealing manner on a bearing sleeve 66 that has an annular stay 67 projecting between the annular disks 63, 64. As shown in FIG. 6, the annular disks 63 and 64 abut at the annular stay 67. The bearing sleeve 66 is inwardly provided with an axially extending groove 68 (FIG. 5) which is engaged in the assembled state of the adjusting drive by a corresponding adjusting spring of a gear shifting shaft.

On the inner cylinder surface of the ring 62 in the shown embodiment a stay 69 in the form of a ring segment which extends approximately over an angular distance of 180° is preferably connected in a detachable manner (FIG. 5). Its axial width corresponds to the distance between the facing inner sides of the annular disks 63 and 64 (FIG. 6). Between the ring segment 69 and the annular stay 67 of the bearing sleeve 66 a control slide 70 is provided that is fixedly connected to the bearing sleeve 66. The control slide 70 rests at the radial inner side of the stay 69 and is displaced in the circumferential direction in a manner which will be described in the following. The control slide 70 is in the shape of a ring segment and extends over an angular distance of approximately 130°. It has radially extending end faces 71 and 72. (FIG. 5). The control slide 70 is rotatable relative to the housing 1d and its stay (ring segment) 69 in a manner which will be described infra.

Within the housing 1d an auxiliary control slide 73 is provided which extends over an angular distance of approximately 90° and has radially extending end faces 74 and 75. These end faces 74 and 75 are bigger than the end faces 71 and 72 of the control slide 70. As shown in FIG. 5, the end faces 74, 75 of the auxiliary control slide 73 extend in the radial direction between the cylindrical inner side 76 of the ring 62 and the cylindrical exterior side 77 of the annular stay 67 of the bearing sleeve 66. The auxiliary control slide 73 rests at the inner side 76 of the ring 62 and the outer side 77 of the annular stay 67 and can be displaced in the circumferential direction within the housing 1d.

The control slide 70 extends in the radial direction from the ring segment 69 to the exterior side 77 of the annular stay 67 of the bearing sleeve 66.

On the inner side 76 of the ring 62 an abutment 78 is connected which is positioned between the two annular disks 63 and 64 as is the control slide 70 and the auxiliary control slide 73. The abutment 78 extends in the shown embodiment from the inner side 76 of the ring 62 to the exterior side 77 of the annular stay 67 of the bearing sleeve 66 (FIG. 5). The abutment 78 extends over an angular distance of approximately 45° and has radially extending end faces 79 and 80. Adjacent to the inner side 76 of the ring 62 the end faces 79 and 80 are each provided with a depression 81, 82 into which the connecting adapter MM as well as the connecting adapter BB open which are provided at the housing 1b. The housing 1b furthermore comprises a connecting adapter AA which opens into the housing in the vicinity of the radial end face 85 of the ring segment 69. The other radial end face 86 of the ring segment 69 is positioned at the level of the opening of the connecting adapter BB and approximately in the radial extension of the end face 80 of the abutment 78.

Figure 8:
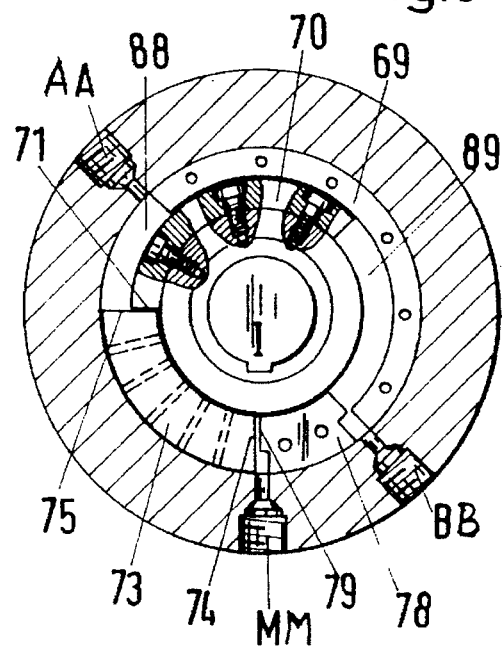
Figure 9:
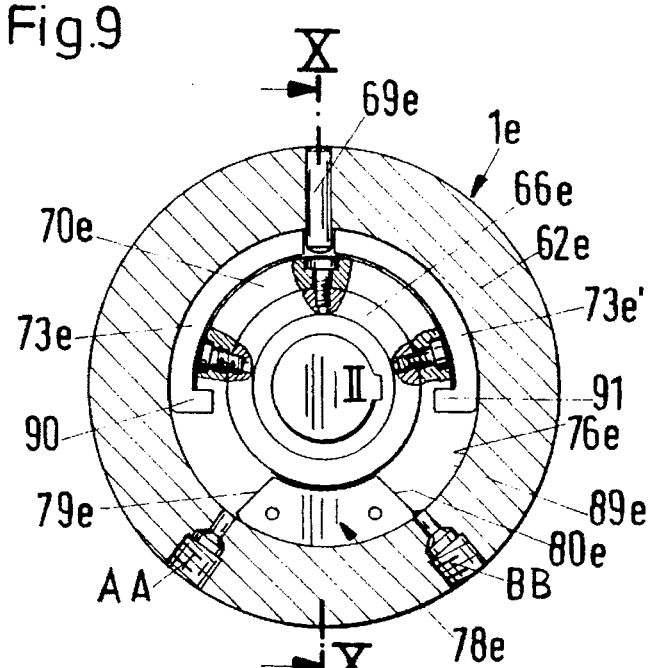
FIGS. 9–12 show a further embodiment of an inventive adjusting drive in representations corresponding to FIGS. 5 to 8.
Figure 10:
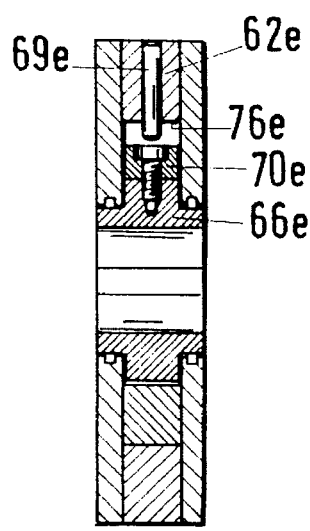
Figure 11:
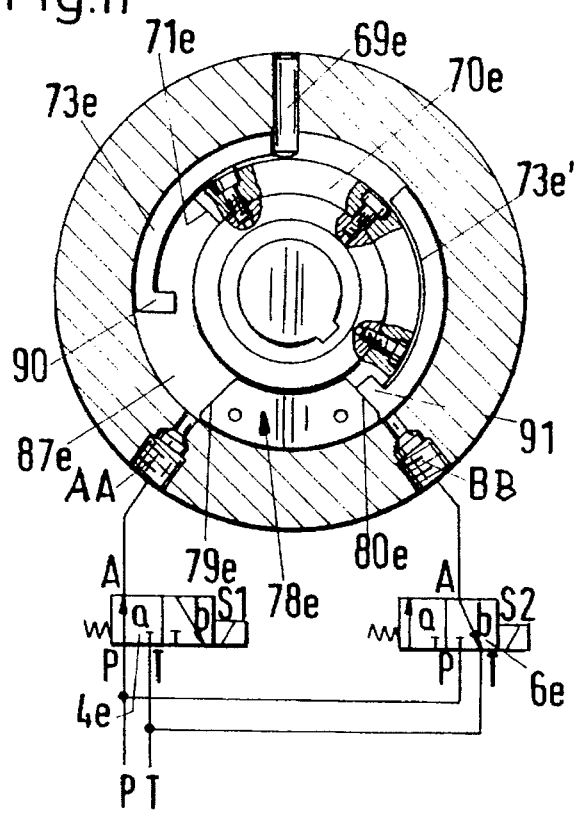
Figure 12:
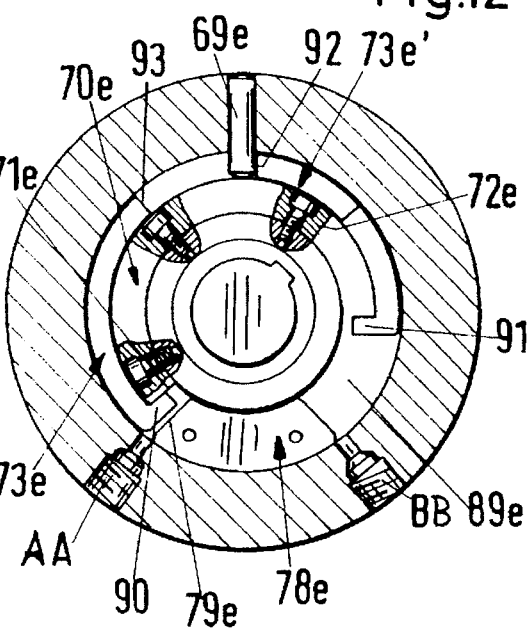

FIG. 8 shows the position I in which the auxiliary control slide 73 with its end face 74 abuts at the end face 79 of the abutment 78. The control slide 70 rests with its end face 71 at the other end face 75 of the auxiliary control slide 73.

When the control slide 70 is to be displaced from the position I (FIG. 8) into the position II (FIG. 5), via the connecting adapter MM pressure is applied while the flow-control valve 4d of the connecting adapter AA is switched such (switching position b) that a connection to the reservoir T is provided. The valve 6d of the connecting adapter BB is also switched such (switching position b) that a connection to the reservoir T is provided. This results in a pressure generation within the pressure chamber 87 between the abutment 78 and the end face 74 of the auxiliary control slide 73 which leads to a loading of the end face 74 of the auxiliary control slide 73 by the pressure medium. The auxiliary piston 73 is thus displaced in the clockwise direction about the axis of the housing 1d whereby the auxiliary control slide 73 entrains the abutting main control slide 70. The hydraulic (pressure) medium present within the pressure chamber 88 (FIG. 8) is displaced via the connecting adapter AA to the reservoir T. In the same manner, in the pressure chamber 89 the hydraulic medium is displaced via the connecting adapter BB to the reservoir T. The pressure chamber 88 is defined in the area between the ring segment 69 of the housing 1d and the end face 75 of the auxiliary control slide 73 and the pressure chamber 89 is defined in the area between the abutment 78 and the main control slide 70. The auxiliary control slide 73 is displaced until it abuts with its end face 75 at the end face of the ring segment 69 of the housing 1d. Now the position II according to FIG. 5 has been reached.

When it is desired to reach the position III (FIG. 7), pressure is supplied via the connecting adapter AA. The connecting adapter MM remains under pressure while the connecting adapter BB is without pressure. The two end faces 74 and 75 of the auxiliary control slide 73 have the same size and in the shown embodiment are twice as large as the end faces 71, 72 of the main control slide 70. Upon loading the connecting adapters AA and MM with the same pressure, the auxiliary control slide 73 thus remains in its initial position at the ring segment 69. The control slide 70, on the other hand, is further rotated in the clockwise direction due to the pressure applied via the connecting adapter AA and the pressure release via the connecting adapter BB until the main control slide 70 abuts with its end face 72 at the end face 80 of the abutment 78. The pressure medium within the pressure chamber 89 is displaced via the connecting adapter BB to the reservoir T.

When the position II (FIG. 5) is to be reached starting from the position III, pressure is Generated via the connecting adapter BB while the connecting adapter AA is relieved of pressure. Due to the pressure Generation via the connecting adapter BB the main control slide 70 is rotated in the counterclockwise direction until it abuts with its end face 71 at the end face 75 of the auxiliary control slide 73. Since the connecting adapter AA is without pressure, the pressure medium within the pressure chamber 88 is displaced via the connecting adapter AA to the reservoir T upon displacement of the main control slide 70. The auxiliary control slide 73 remains in its abutment position at the ring segment 69 due to the pressure load at its greater end face 74 via the connecting adapter MM.

In order to again reach the position I (FIG. 8), the flow-control valve 4d is switched such that the connecting adapter AA is without pressure. The flow-control valve 5d of the connecting adapter MM is switched such that a connection to the reservoir T is provided. The valve 6d of the connecting adapter BB remains in its switching position a so that the main control slide 70 is further supplied with pressure medium at its end face 72. The main control slide 70 is displaced in a counterclockwise direction and entrains during this movement the auxiliary control slide 73 to such an extent that it abuts with its end face 74 at the end face 79 of the abutment 78 (FIG. 8).

This adjusting drive can also be produced with very few components. The ring 62, the abutment 78, and the ring segment 69 can be manufactured as a unitary part. Furthermore, the bearing sleeve 66 and the main control slide 70 can be manufactured as a unitary part. These parts can advantageously be produced in packets by wire erosion methods so that, for example, in one manufacturing process 10 or 20 identical parts can be manufactured. In this manner, an especially inexpensive manufacture of these rotary adjusting drives is possible.

The function of this rotary adjusting drive corresponds to the embodiment according to FIG. 2 which shows a linearly operating adjusting drive.

The rotary adjusting drive according to FIG. 9 to FIG. 12 corresponds in its function to the linearly operating adjusting drive of FIG. 3. The adjusting drive of FIGS. 9–12 has substantially the same housing design as the embodiment according to FIGS. 5 to 8. However, the ring segment 69 serving as the abutment for the auxiliary control slide is missing. Instead, the abutment 69e is in the form of a radially extending bolt which is inserted into the ring 62e of the housing 1e and extends in the radial direction past the cylindrical inner side 76e of the ring 62e.

Diametrically opposite to this abutment 69e the abutment 78e is provided which in the circumferential direction is wider than in the previously described embodiment. Its two end faces 79e and 80e extend over the entire radial width of the abutment 78e. The connecting adapters AA and BB open in the area adjacent to the end faces 79e, 80e of the abutment 78e. The main control slide 70e is again fixedly connected to the bearing sleeve 66e.

Two auxiliary control slides 73e, 73e' are slidably supported on the main control slide 70e. The auxiliary control slides 73e, 73e' are in the form of a ring segment and which have at their end facing away from one another a radially inwardly oriented flange 90 and 91. The two auxiliary control slides 73e, 73e' rest at the inner side 76e of the housing ring 62e as well as at the outer side of the main control slide 70e.

Flow-control valves 4e and 6e are connected to the connecting adapters AA and BB.

In the position I (FIG. 12) the auxiliary control slide 73e with its flange 90 abuts at the end face 79e of the abutment 78eThe main control slide 70e rests furthermore with its end face 71e at the inner side of the flange 90. The other auxiliary control slide 73e' abuts with its end face 92, facing away from the flange 91, at the abutment 69e which extends in the radial direction into the vicinity of the control slide 70e. In order to displace the control slide 70e into the position II according to FIG. 9, the flow-control valve 4e is switched such that the hydraulic (pressure) medium is supplied under pressure via the connecting adapter AA. The flow-control valve 6d is switched such that the pressure chamber 89e is also pressurized. The surfaces of the auxiliary control slide 73e and of the main control slide 70e which are loaded by the pressure medium via the connecting adapter AA are together of the same size as the abutment surface 79e in the shown embodiment. The surface 72e which is loaded with pressure medium via the connecting adapter BB is half the size of the abutment surface 80e which is identical to the size of the abutment surface 79e. This results in the auxiliary control slide 73e' remaining in abutment at the abutment 69e while the auxiliary control slide 73e is displaced in the clockwise direction. This movement entrains via the flange 90 the main control slide 70e. Depending on the tolerances, either the control slide 70e with its end face 72e abuts at the flange 91 of the auxiliary piston 73e' or the end face 93 of the auxiliary control slide 73e rests at the abutment 69e. This results in a defined position II of the control slide 70e. Since the auxiliary control slide 73e' is pressurized by the hydraulic medium within the pressure chamber 89e, this auxiliary control slide 73e' and thus also the control slide 70e are maintained reliably in their position II.

In order to displace the control slide 70e again into the position III (FIG. 11), the flow-control valve 6e of the connecting adapter BB is switched such that a connection to the reservoir T is provided. The flow-control valve 4e remains in its switched position such that the pressure within the pressure chamber 87e is maintained. The main control slide 70e is thus displaced in clockwise direction and via the flange 91 entrains the auxiliary control slide 73e'. The position III is reached when the auxiliary control slide 73e' with its flange 91 abuts at the end face 80e of the abutment 78e.

When it is desired to displace the control slide 70e from the position III into one of the positions II or I, the flow-control valves 4e and 6e are correspondingly switched. The flow-control valve 6e is switched such that the pressure medium loads via the connecting adapter BB the flange 91 of the auxiliary control slide 73e' and the end face 72e of the control slide 70e. The connecting adapter AA remains pressurized so that the auxiliary control slide 73e remains in abutment at the abutment 69e and the control slide 70e is loaded via its end face 71e. The auxiliary control slide 73e' and the control slide 70e are displaced counterclockwise whereby the auxiliary control slide 73e' with its flange 91 abuts at the control slide 70e. Depending on tolerances, either the auxiliary control slide 73e' abuts at the abutment 69e or the control slide 70e abuts with its end face 71e at the flange 90 of the auxiliary control slide 73e. This then results again in the position II.

In order to displace the main control slide 70e farther into the position I, the connecting adapter AA is relieved of pressure so that the main control slide 70e, due to the pressure within the pressure chamber 89e, is displaced counterclockwise and via the flange 90 entrains the auxiliary control slide 73e until it abuts at the end face 79e of the abutment 78e.

Figure 13:
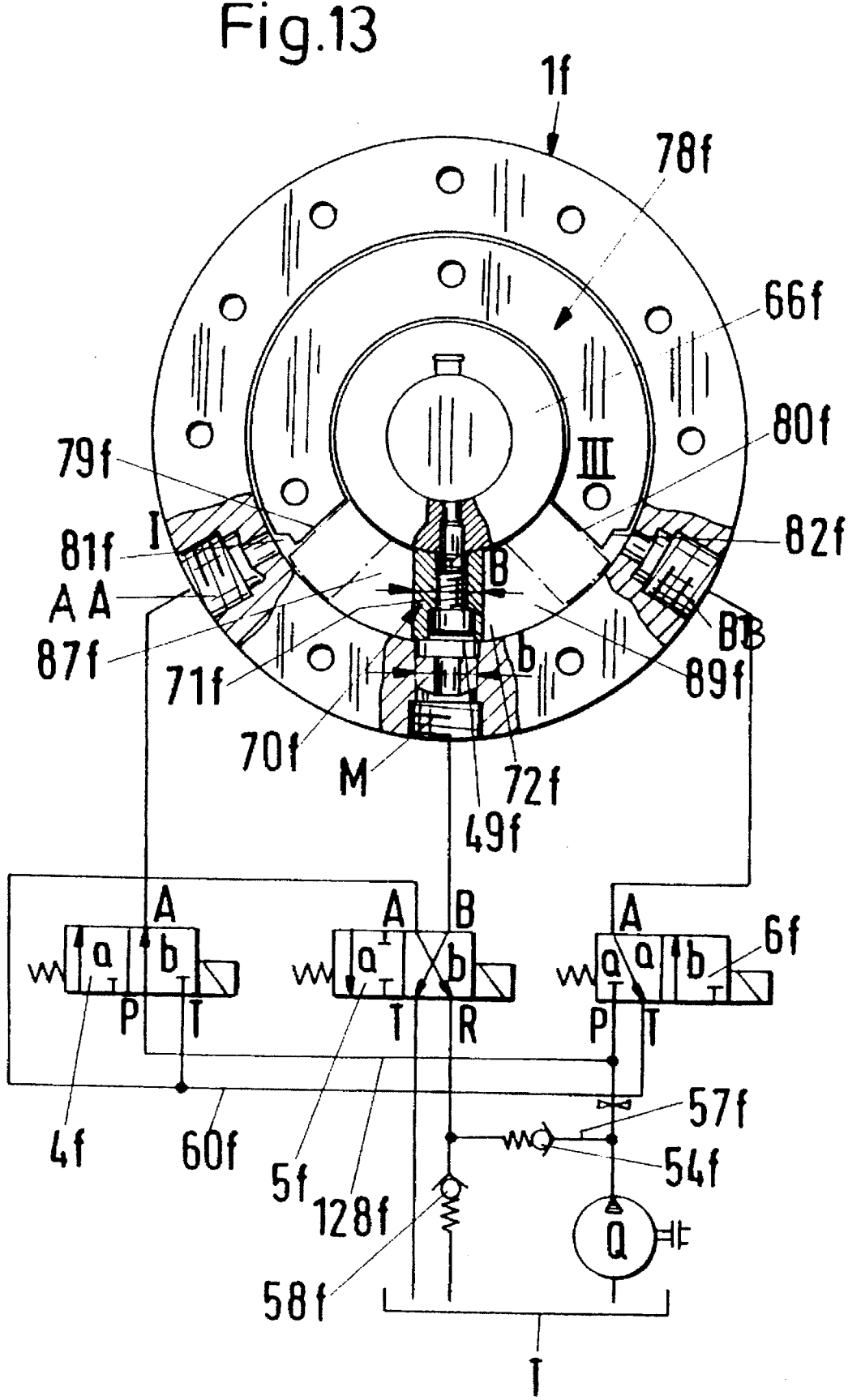
FIG. 13 shows a further embodiment of an inventive adjusting drive partially in an end view and partially in section.

FIG. 13 shows a rotary adjusting drive which in its function corresponds to the linearly operating adjusting drive of FIG. 4a to FIG. 4f. The housing if is of a simpler construction as in the aforementioned embodiments because the auxiliary control slides are obsolete. The bearing sleeve 66f has the same construction as in the aforementioned embodiments and is surrounded by the abutment 78f over an angular distance of more than 180°, in the shown embodiment by about 250°. The two end faces 79f and 80f of the abutment 78f form the abutments for the main control slide 70f which again is fixedly connected to the bearing sleeve 66f. The radial width of the control slide 70f corresponds to the radial distance between the housing ring and the bearing sleeve. The housing if is provided with connecting adapters AA, MM and BB which are connected to flow-control valves 4f to 6f. Between the end faces 79f and 80f of the abutment 78f at the housing 1f and the adjacent correspondingly radially extending end faces 71f and 72f of the main control slide 70f the pressure chambers 87f and 89f are defined.

In FIG. 13 the position II is represented in solid lines while in dash-dotted lines the positions I and III of the control slide 70f are indicated.

The connecting adapters AA and BB open in the area of the end faces 79f and 80f of the abutment 78f. In this area the end faces are provided with depressions 81f, 82f so that the hydraulic medium can enter the pressure chambers even when the main control slide 70f abuts at the respective end faces of the abutment 78f.

When the control slide 70f abuts at the end face 79f of the abutment 78f, the position I is reached. In order to displace the control slide 70f from this position I into the intermediate position II (solid line in FIG. 13), the flow-control valves 4f and 5f are switched into the switching position b while the flow-control valve 6f is switched into the switching position a. Via the pressure medium source Q the hydraulic medium flows through the line 128f to the flow-control valve 4f and from there via the connecting adapter AA of the housing if into the pressure chamber 87f. The control slide 70f is thus loaded and is displaced in the direction toward the position II in a counterclockwise direction. The pressure medium present within the pressure chamber 89f is displaced first via the connecting adapter MM to the connector B of the flow-control valve 5f and from there to the reservoir T. As soon as the control slide 70f passes with its control edge 72f the corresponding edge of the control opening 49f and closes the control opening 49f, the passage for the hydraulic medium through the connecting adapter MM is closed. Now the hydraulic medium can only be displaced via the connector V of the housing if to the connecting adapter AA of the flow-control valve 6f.

Via the connector T of the flow control valve 6f the displaced hydraulic medium flows through the line 60f to the connector A of the flow-control valve 5f and from there via the pressurizing valve 58f to the reservoir T. In the pressure chamber 89f the pressure is smaller than within the pressure chamber 87f so that the control slide 70f is further displaced in the counterclockwise direction. Accordingly, the control slide 70f slightly opens the control opening 49f with the control edge 71f so that the pressure within the pressure chamber 87f is reduced to such an extent that in both pressure chambers 87f and 89f the same pressure prevails. Accordingly, the control slide 70f assumes its defined position II.

From this position II the control slide 70f can be further displaced in the counterclockwise direction into the position III in which it abuts at the end face 80f at the abutment 78f. In order to make possible this rotary movement, the flow-control valve 5f is brought into the switching position a while the flow-control valve 4f remains in the switching position b and the flow-control valve 6f remains in the switching position a. Thus, the connecting adapter MM is closed so that via this connecting adapter MM no hydraulic medium can flow into the pressure chamber 87f. Accordingly, the control slide 70f is further rotated in the counterclockwise direction whereby the medium present within the pressure chamber 89f is guided into the reservoir T via the connecting adapter BB and the flow-control valve 6f in the aforedescribed manner.

When it is desired to return the control slide 70f from the position III into the position II, the flow-control valve 6f is switched into the switching position b, the flow-control valve 4f into the switching position a, and the flow-control valve 5f into the switching position b. The hydraulic medium is then supplied from the pressure medium source Q via the flow-control valve 6f and the connecting adapter BB at the housing if into the pressure chamber 89f. This results in a rotation of the control slide 70f in the clockwise direction. The hydraulic medium present within the pressure chamber 87f is guided via the connecting adapter MM to the connector B of the flow-control valve 5f and from there directly to the reservoir T. As soon as the control slide 70f, having a width B that is greater than the cross-sectional width of the control opening 49f completely closes the control opening 49f, a greater pressure is present in the pressure chamber 89f than in the pressure chamber 87f. This results in the control slide 70f being further rotated in the clockwise direction until its control edge 72f slightly opens the control opening 49f. Accordingly, the pressure within the pressure chamber 89f can be reduced such that it is of the same magnitude as the pressure within the pressure chamber 87f. This results in the position II being reached again.

In order to further rotate the control slide 70f into the position I, the flow-control valve 4f is switched into the switching position a, while the two flow valves 5f and 6f are maintained in their switching positions. Accordingly, the hydraulic medium from the pressure chamber 87f is guided via the connecting adapter AA to the connector A of the flow-control valve 4f and from there via its connector T and the line 60f to the connector A of the flow-control valve 5f and from there directly to the reservoir T.

This movement is in principle identical to the linearly operating adjusting drive of FIGS. 4a to 4f.

The control slide 70f can also be displaced in one single movement from the position III into the position I and vice versa. In this case, the flow-control valve 5f must remain constantly in the switching position a so that the connecting adapter MM is closed. Otherwise, the movements occur in the same manner as described above.

Figure 14:
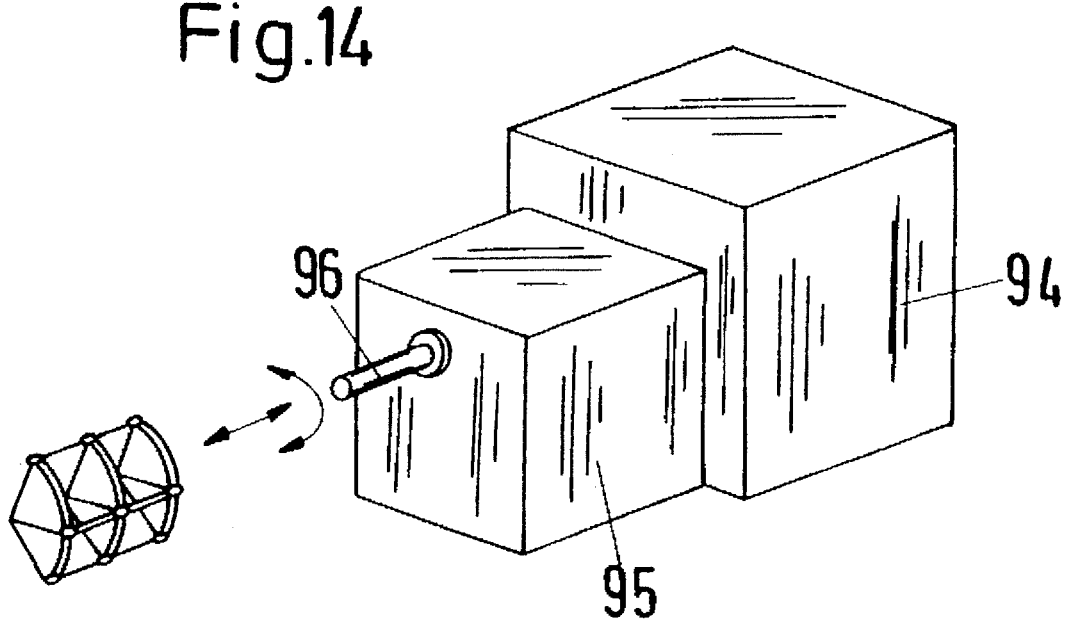
FIG. 14 shows a transmission of a motorized vehicle with a gear shifting shaft.

FIG. 14 shows in a schematic representation an engine 94, for example, an internal combustion engine of a motorized vehicle, having a transmission 95 that has a central gear shifting shaft 96. This gear shifting shaft 96 must be displaced for a gear shifting operation in its longitudinal direction and furthermore must be rotated about its axis which is indicated by the shown arrows. The displacement of the gear shifting shaft 96 is required in order to reach the different gear shifting paths of the transmission and the rotation is required in order to reach the desired gear. Depending on the construction of the transmission 95 the function of displacement and rotation of the gear shifting shaft 96 may also be reversed. The drive shaft which extends from the transmission 95 is not represented in FIG. 14 in order to simplify the drawing. For displacement of the gear shifting shaft 96 the adjusting drives described with the aid of FIGS. 1 to 13 are to be used. This will be explained in the following in more detail.

Figure 15:
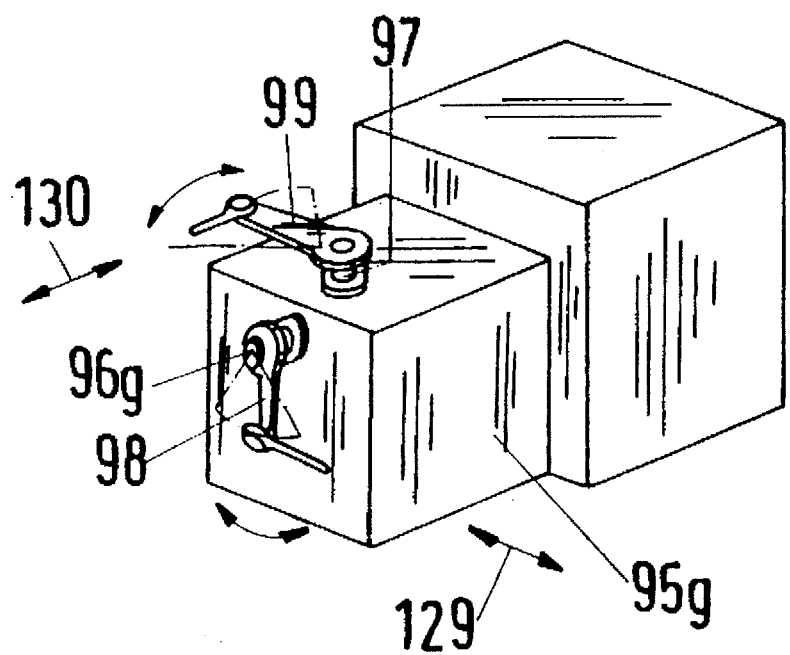
FIG. 15 shows another embodiment of a transmission for a motorized vehicle with two gear shifting shafts.

FIG. 15 shows an embodiment in which the transmission 95g has two gear shifting shafts 96g and 97 which in the shown embodiment are perpendicular to one another. The gear shifting shaft 96 g is rotated about its axis in the direction of the shown double arrows for which purpose a linearly operating adjusting drive is used which in FIG. 15 is indicated by a corresponding double arrow 129.

The other gear shifting shaft 97 is also rotatable about its axis for which purpose also a linearly operating adjusting drive is used (double arrow 130). The connection between the gear shifting shaft 96g, 97 is acheived with intermediate members in the form of levers 98 and 99 which are fixedly connected to the gear shifting shafts and are connected to the adjusting drives in a manner which will be explained in the following.

The transmission 95g can be embodied such that two or only one gear shifting shaft is displaced in its axial direction. In FIG. 15 the drive shaft which extends from the transmission 95g is not shown in order to simplify the drawing.

FIG. 16 shows with the aid of the transmission 95g the connection of two linearly operating adjusting drives to the gear shifting shafts 96g and 97. The schematically represented adjusting drives 100 and 101 correspond to the embodiment of FIGS. 4a to 4f. In order to rotate a respective shaft 96g, 97, the main piston 2c of the adjusting drive is displaced in the axial direction in the described manner. At one end of the main piston 2c an intermediate member in the form of a coupling piece 102, 103 and a lever 98, 99 fastened to the coupling piece 102, 103 is connected. Thus, by displacing the main piston 2c the gear shifting shaft can be rotated in the desired direction. The adjusting drives 100, 101, of course, can also correspond to an embodiment corresponding to FIGS. 1 to 3.

In the embodiment according to FIG. 17 rotary operating adjusting drives 104, 105 are seated on the two gear shifting shafts 96g, 97 which adjusting drives are embodied according to FIGS. 5 to 13. For example, the adjusting drives may have an embodiment corresponding to FIGS. 5 to 8. These adjusting drives are seated fixedly with their bearing sleeves 66 on the gear shifting shafts 96g, 97 which with a corresponding adjusting spring engage the groove 68 of the bearing sleeve 66. As explained with the aid of FIGS. 5 to 8, the main and auxiliary control slides 70, 73 can be rotated within the housing 1d of the adjusting drive in the desired direction such that the attached gear shifting shaft is correspondingly rotated. The housing 1d of the adjusting drives 104, 105 is, of course, supported in a non-rotatable manner. In comparison to the embodiment of FIG. 16 with the linearly operating adjusting drives 100, 101, the rotatory adjusting drives 104, 105 require only little space.

In a further non-represented embodiment one of the gear shifting shafts may be (axially) displaceable and the other gear shifting shaft may be rotatable. It is also possible to provide two gear shifting shafts that are axially displaceable.

FIG. 18 shows an embodiment in which the central switching shaft 96h of the transmission 95h is axially displaceable and rotatable with two linearly operating adjusting drives 100h, 101h. The two adjusting drives 100h, 101h are connected to a switching unit 106 in which a switching element 107 is arranged. This switching element 107 is piston-shaped and can be displaced within the switching unit 106 in its axial direction and can be rotated about its axis. The switching element 107 is connected to the main piston 2c of the adjusting drive 100h. By displacing the main piston 2c in the axial direction, the switching element 107 is also axially displaced within the switching unit 106. On the gear shifting shaft 96h a lever 98h is fixedly connected which at the free end is provided with a ball 108 that engages a correspondingly designed bore 109 of the switching element 107. When the switching element 107 is axially displaced by the piston rod 2c of the adjusting drive 100h, the gear shifting shaft 96h is also axially displaced via the lever 98h.

The piston rod 2c of the other adjusting drive 101h is arranged transverse, preferably, perpendicular to the axis of the adjusting drive 100h and the axis of the switching element 107 and has for example a non-represented toothing which engages a counter toothing of the switching element 107. This counter toothing is provided at the side of the switching element 107 diametrically opposed to the depression 109 and is positioned on a circular segment having an axis that corresponds to the axis of the switching element 107. When the piston rod 2c of the adjusting drive 101h is axially displaced, the switching element 107 is rotated about its axis due to the engagement of the toothing of the piston rod with the counter toothing. Accordingly, the lever 98h is correspondingly pivoted so that the gear shifting shaft 96h is rotated correspondingly about its axis.

By actuating the adjusting drive 101h, the gear shifting shaft 96h of the transmission is thus moved into the corresponding gear shifting path. Subsequently, the gear shifting shaft 96 is moved into the corresponding gear with the adjusting drive 100h. Depending on the construction of the transmission, the gear shifting shaft 96h can also be moved with the adjusting drive 100h into the gear shifting path and with the adjusting drive 101h into the gear.

FIG. 19 shows the possibility that the two adjusting drives 100*i*, 101*i* which are again linearly operating adjusting drives and positioned transverse to one another with respect to their axes, preferably perpendicular to one another, cooperate directly with one another. The piston rod 2*c* of the adjusting drive 101*i* is provided with a toothed rod 110 that engages a toothed wheel 101 that is fixedly connected to the piston rod 2*c* of the adjusting drive 100*i*. The piston 2*c* is provided with a spring 112 that engages the groove 113 of the toothed wheel 111. The length of the spring 112 corresponds at least to the maximum displacement path of the piston 2*c* of the adjusting drive 100*i*. For reasons of simplification of the drawing, the transmission is not represented in FIG. 19. The gear shifting shaft 96*i* is only represented by the gear shifting diagram which is positioned in alignment with the piston 2*c* of the adjusting drive 100*i* and which is fixedly connected to it. By axially displacing the piston 2*c* of the adjusting drive 100*i*, the gear shifting shaft 96*i* is also axially displaced. In this manner, different gears or gear shifting paths can be selected. By displacing of the piston 2*c* of the adjusting drive 101*i*, the piston 2*c* of the adjusting drive 100*i* is rotated due to the engagement of the teeth so that the gear shifting shaft is correspondingly rotated.

Both adjusting drives 100*i*, 101*i* can have a common housing which in the area of the toothed wheel 111 is provided with a corresponding shaping. This toothed wheel is axially secured within the adjusting drive 100*i* so that it is in constant engagement with a toothed rod 110 of the adjusting drive 101*i*.

FIG. 20 shows an embodiment of a especially compact design. For axially displacing and rotating the gear shifting shaft 96*j*, a linearly operating adjusting drive as we 11 as a rotary adjusting drive 104*j* are provided. This rotary adjusting drive may be embodied according to any of the embodiments according to FIGS. 5 to 13. It is positioned with the bearing sleeve 66*j* on the piston 2*c* of the adjusting drive 100*j*. The piston 2*c* is provided with an adjusting spring 112*j* which engages the groove 68*j* of the bearing sleeve 66*j*. The length of the adjusting spring 112*j* corresponds again at least to the maximum displacement path of a piston 2*c* so that at any time a form-locking connection between it and the bearing sleeve 66*j* is ensured. The adjusting drive 104*j* is axially fixedly supported. In order to move the gear shifting shaft 96*j* into the desired gear shifting path, respectively, into the desired gear, the adjusting drive 104*j* is actuated so that via the bearing sleeve 66*j* the piston 2*c* is rotated about its axis. Subsequently, the piston 2*c* is axially displaced so that the gear shifting shaft 96*j* is axially displaced and thereby the shifting into the desired gear takes place, respectively, the desired gear shifting path is selected.

FIGS. 21 to 24 show different possibilities to couple linearly operating adjusting drives with one another.

Figure 21:
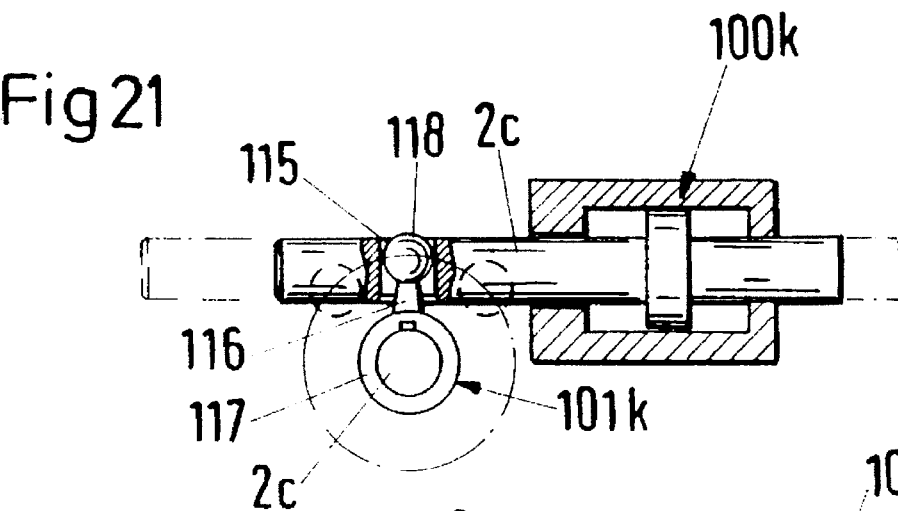
FIGS. 21–24 respectively show in section and partially in an end view different coupling possibilities between the gear shifting shaft and the adjusting drive.

In the embodiment schematically represented in FIG. 21 the piston rod of the piston 2*c* of the adjusting drive 100*k* has a bore 115 penetrating the same and arranged external to the housing. A ever 116 engages the bore 115 and is radially positioned relative to the piston 2*c* of the adjusting drive 101*k*. The radially extending lever 116 is connected to a ring 117 which is rotatably seated on the piston rod 2*c* of the piston of the adjusting drive 101*k*. The piston 2*c* of this adjusting drive 101*k* can be displaced axially relative to this ring 117. The free end the lever 116 is provided with a ball 118 that is positioned in the bore 115. When the piston 2*c* of the adjusting drive 100*k* is displaced, the piston 2*c* of the adjusting drive 101*k* is correspondingly rotated about its axis with the lever 116 and the ring 117. The ball 118 is axially displaced within the bore 115. The two end positions of the ball 118 for the maximum displacement path of a piston 2*c* of the adjusting drive 100*k* are represented in dashed lines in FIG. 21. In this manner, with the displacement movement of the piston 2*c* of the adjusting drive 100*k*, the piston 2*c* of the other adjusting drive 101*k* can be rotated. Accordingly, as explained supra with the aid of FIGS. 14 to 20, the gear shifting shaft connected to the piston 2*c* of the adjusting drive 101*k* can be moved into the desired gear shifting path, respectively, into the desired gear. When subsequently the piston 2*c* of the adjusting drive 101*k* is axially displaced, the gear shifting shaft of the transmission is displaced into the corresponding gear or gear shifting path.

Figure 22:
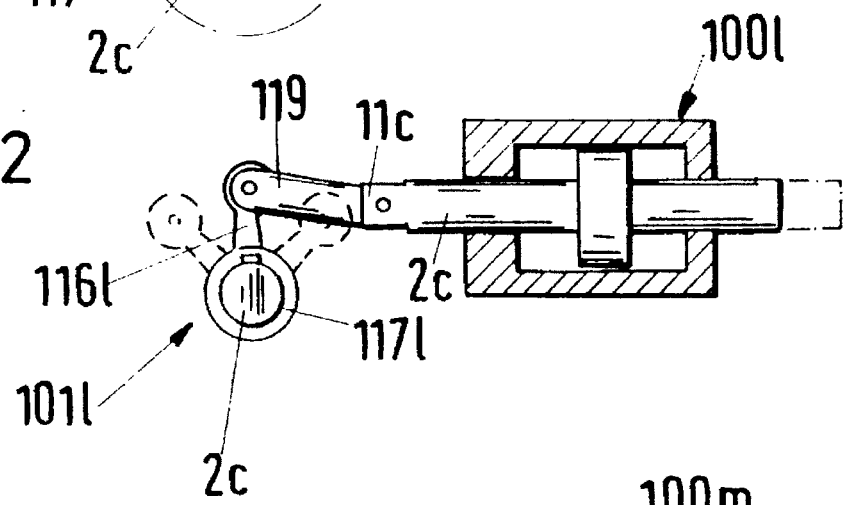

In the embodiment according to FIG. 22 one end of the lever 119 is connected to the end 11*c* of the piston 2*c* of the adjusting drive 100*l* whereby the other end is connected to the lever 116*l* of the adjusting drive 101*l*. The lever 116*l* extends radially from the ring 117*l* which is rotatably fixedly connected to the piston rod of the piston 2*c* of the adjusting drive 101*l*. By displacing the piston 2*c* of the adjusting drive 110*l*, the piston 2*c* of the adjusting drive 117*l* is rotated about its axis with the lever 116*l* and the ring 117*l*. The two end positions of the lever 116*l* are again represented in dashed lines. The piston 2*c* of the adjusting drive 101*l* can be displaced axially relative to the ring 117*l*.

Figure 23:
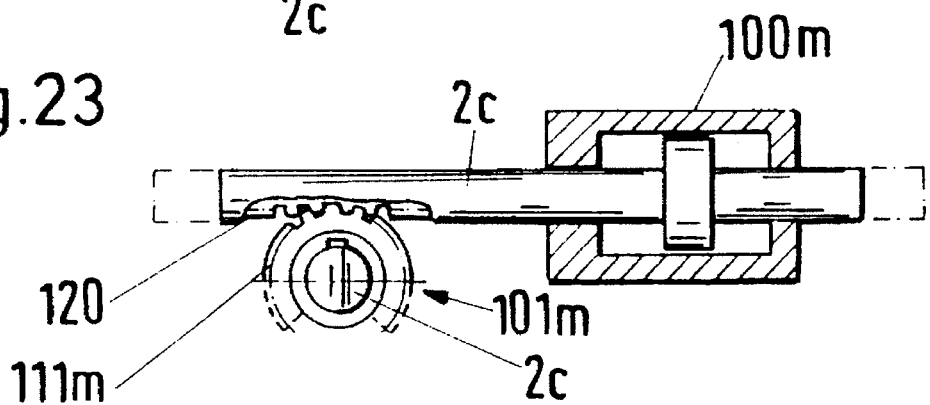

FIG. 23 shows a constructively simple embodiment. The piston 2*c* of the adjusting drive 100*m* in the area external to the housing is provided with a toothing 120 which is engaged by the toothed wheel 111*m* that is rotatably fixedly connected to the piston 2*c* of the adjusting drive 101*m*. By displacing the piston 2*c* of the adjusting drive 100*m* the piston rod 2*c* of the adjusting drive 101*m* is rotated with the toothed wheel 111*m*. In contrast to the embodiments according to FIGS. 21 and 22, the piston 2*c* of the adjusting drive 100*m* directly engages the toothed wheel 111*m*. The toothed wheel 111*m*, as can be seen in FIG. 23, may be segmented.

Figure 24:
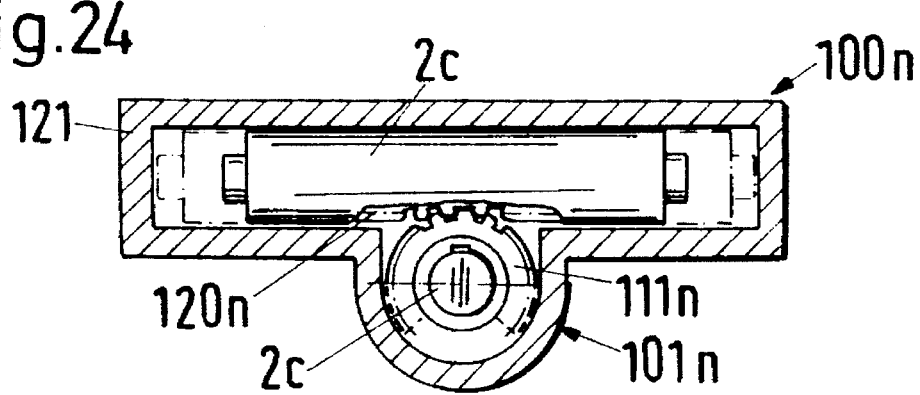

In the embodiment according to FIG. 24 the two adjusting drives 100*n* and 101*n* have a common housing 120*n* in which the two pistons 2*c* of the adjusting drives are positioned. The plunger piston 2*c* coordinated with the adjusting drive 100*n* has in the area between its loaded surface a toothing 120*n* which engages the toothed wheel 111*n*. The operation of this embodiment corresponds to the operation of the embodiment according to FIG. 23.

Figure 25:
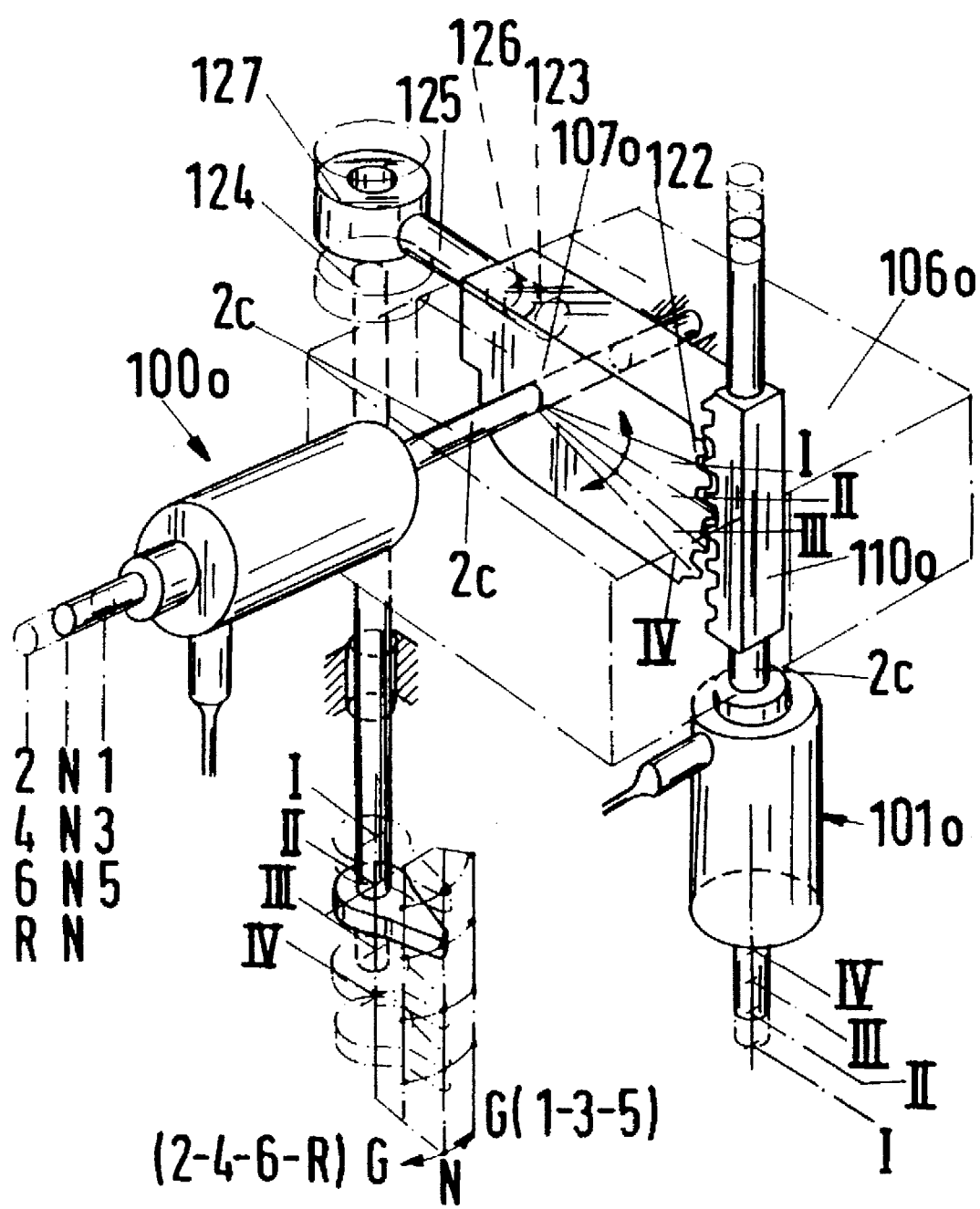
FIG. 25 shows in a schematic representation the shifting of a gear shifting shaft of a transmission with two adjusting drives.

In the embodiment according to FIG. 25 in the switching unit 106*o* the switching element 107*o* is positioned which is fixedly connected to the piston rod of the piston 2*c* of the adjusting drive 100*o*. On the piston rod of the piston 2*c* of the other adjusting drive 101*o* the toothed rod 110*o* is provided which engages the toothing segment 122 at the end face of the switching element 107*o*. At the opposite end face the switching element 107*o* is provided with a bore 123 that is engaged by a lever 125 with a ball 126. The lever 125 extends radially relative to the gear shifting shaft 124 from a ring 127 that is fixedly mounted on the gear shifting shaft 124. The gear shifting shaft extends parallel to the piston 2*c* of the adjusting drive 101*o*.

By displacing the piston 2*c* of the adjusting drive 101*o*, the switching element 107*o* is pivoted about the axis of the piston 2*c* of the adjusting drive 100*o* with the toothed rod 110*o*. Via the lever 125, engaging the switching element 107*o* and the ball 126, the gear shifting shaft 124 is correspondingly axially displaced. This displacement movement of the gear shifting shaft 124 may be the so-called shift or gear movement with which the gear shifting path and gears are selected.

By displacing the piston 2c of the adjusting drive 100o, the switching element 107o fixedly seated on the piston rod of the piston is correspondingly displaced. Thus, via the lever 125 and the ball 126 the gear shifting shaft 124 is rotated about its axis. This displacement movement of the piston 2c of the adjusting drive 100o can be the movement into the gear shifting path or into the gear (shift movement or gear movement). The bore 123 within the switching element 107o is designed such that the lever 125 and the ball 126 can perform the required movement for rotating the switching shaft 124.

The present invention is, of course, in no way restricted to the specific disclosure of the specification and drawings, but also encompasses any modifications within the scope of the appended claims.

What we claimed is:

1. An adjusting drive system for a transmission of motorized vehicles, said system comprising:

a gear shifting shaft;

a first and second adjusting drive operatively connected to said gear shifting shaft, wherein said first adjusting drive rotates said gear shifting shaft and said second adjusting drive axially displaces said gear shifting shaft;

wherein said first adjusting drive is a linear drive having an axially displaceable adjusting member;

wherein said second adjusting drive is a linear drive having an axially displaceable adjusting member;

wherein said axially displaceable adjusting members are displaceable transverse to one another; and a switching element, connected to said gear shifting shaft and to said first and second adjusting drives.

2. A system according to claim 1, wherein said axially displaceable adjusting members are displaceable in directions perpendicular to one another.

3. A system according to claim 1, wherein:

said switching element is rotatably connected to said adjusting member of said first adjusting drive and has a toothing; and said adjusting member of said second adjusting drive has a toothed rack engaging said toothing of said adjusting member of said first adjusting drive.

4. A system according to claim 1, wherein said gear shifting shaft has a lever and wherein said switching element has a receiving element for receiving said lever.

5. A system according to claim 4, wherein said lever extends radially from said gear shifting shaft and is fixedly connected thereto.

6. An adjusting drive system for a transmission of motorized vehicles, said system comprising:

a gear shifting shaft;

a first and a second adjusting drive operatively connected to said gear shifting shaft wherein said first adjusting drive rotates said gear shifting shaft and said second adjusting drive axially displaces said gear shifting shaft;

wherein said first adjusting drive is a linear drive having an axially displaceable adjusting member;

wherein said second adjusting drive is a linear drive having an axially displaceable adjusting member;

wherein said axially displaceable adjusting members are displaceable transverse to one another; and said adjusting member of said first adjusting drive having a lever and said adjusting member of said second adjusting drive having a pivot arm, said pivot arm connected to said lever.

7. A system according to claim 6, wherein said axially displaceable adjusting members are displaceable in directions perpendicular to one another.

8. An adjusting drive system for a transmission of motorized vehicles, said system comprising:

a gear shifting shaft;

a first and a second adjusting drive operatively connected to said gear shifting shaft, wherein said first adjusting drive rotates said gear shifting shaft and said second adjusting drive by an axially displaceable adjusting member;

wherein said first adjusting drive is a linear drive and second adjusting drive is a rotary drive having a rotary adjusting member, said rotary adjusting member fixedly connected on said axially displaceable adjusting member.

* * * * *